United States Patent
Lee et al.

(10) Patent No.: US 9,491,618 B2
(45) Date of Patent: Nov. 8, 2016

(54) SERVING NETWORK AUTHENTICATION

(71) Applicant: QUALCOMM Incorporated, San Diego, CA (US)

(72) Inventors: Soo Bum Lee, San Diego, CA (US); Anand Palanigounder, San Diego, CA (US); Gavin Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/674,763

(22) Filed: Mar. 31, 2015

(65) Prior Publication Data
US 2016/0094988 A1 Mar. 31, 2016

Related U.S. Application Data

(60) Provisional application No. 62/056,371, filed on Sep. 26, 2014.

(51) Int. Cl.
*H04W 12/04* (2009.01)
*H04L 9/08* (2006.01)

(52) U.S. Cl.
CPC ............ *H04W 12/04* (2013.01); *H04L 9/0816* (2013.01); *H04L 9/0822* (2013.01); *H04L 2209/24* (2013.01); *H04L 2463/062* (2013.01)

(58) Field of Classification Search
CPC ..................................................... H04W 12/04
See application file for complete search history.

(56) References Cited

U.S. PATENT DOCUMENTS

| | | | |
|---|---|---|---|
| 8,149,770 B2* | 4/2012 | Patil | H04W 36/14 370/328 |
| 8,347,090 B2 | 1/2013 | Holtmanns et al. | |
| 8,699,709 B2* | 4/2014 | Thomas | H04W 12/06 380/247 |
| 8,713,320 B2 | 4/2014 | Xu et al. | |
| 8,850,545 B2* | 9/2014 | Cha | H04L 63/168 726/8 |
| 8,861,732 B2 | 10/2014 | Suh et al. | |

FOREIGN PATENT DOCUMENTS

| | | |
|---|---|---|
| EP | 2521387 A2 | 11/2012 |
| EP | 2613581 A1 | 7/2013 |

OTHER PUBLICATIONS

"Handbook of Applied Cryptography, Chapter 13: Key Management Techniques ED—Menezes A J; Van Oorschot P C; Vanstone S A", Jan. 1, 1997 (Jan. 1, 1997), Handbook of Applied Cryptography; [CRC Press Series on Discrete Mathematices and Its Applications], CRC Press, Boca Raton, FL, US, pp. 546-570, XP001091019, ISBN: 978-0-8493-8523-0 p. 546-p. 555.

(Continued)

*Primary Examiner* — Teshome Hailu
*Assistant Examiner* — Thanh Le
(74) *Attorney, Agent, or Firm* — Loza & Loza LLP

(57) ABSTRACT

A method, an apparatus, and a computer program product for wireless communication are provided. The method may include establishing a connection with a serving network, transmitting an encrypted authentication credential that includes a randomly selected key encryption key (KEK) and a serving network identifier to the serving network, receiving authentication information and a signature from the serving network, and authenticating the serving network by verifying the signature based on the KEK. The encrypted authentication credential may be operative to identify the serving network. The signature may be generated using the KEK.

30 Claims, 17 Drawing Sheets

(56) References Cited

OTHER PUBLICATIONS

International Search Report and Written Opinion—PCT/US2015/047295—ISA/EPO—Dec. 4, 2015.

Shidhani A.A., et al., "Reducing Re-Authentication Delays during UMTS-WLAN Vertical Handovers," Personal, Indoor and Mobile Radio Communications, 2008. PIMRC 2008. IEEE 19th International Symposium on, IEEE, Piscataway, NJ, USA, Sep. 15, 2008 (Sep. 15, 2008), pp. 1-5, XP031371662, ISBN: 978-1-4244-2643-0 pp. 2,3.

* cited by examiner

SERVING NETWORK AUTHENTICATION

CROSS-REFERENCE TO RELATED APPLICATIONS

This application claims priority to and the benefit of Provisional Patent application No. 62/056,371 filed in the U.S. Patent Office on Sep. 26, 2014, the entire content of which is incorporated herein by reference.

TECHNICAL FIELD

The present disclosure relates generally to communication systems, and more particularly, to a system for authentication between user equipment and a serving network in a wireless communications system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. As multiple access technologies are improved and augmented, new telecommunication standards emerge. An example of an emerging telecommunication standard is the fourth generation Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology, and/or for new generations telecommunication standards with improved capabilities.

Security configuration is an initial step in setting up a logical bearer or channel (e.g., a communication link between a mobile communication device and a network entity or access node) in LTE networks. Key derivation and establishment is a part of this security configuration. Most of the keys generated are ciphering and integrity keys for Non-Access Stratum (NAS) Security Mode Configuration (NAS SMC) and Access Stratum (AS) Security mode Configuration (AS SMC). As new generations of communications technology are deployed, vulnerabilities to attack may be exposed in the security configuration processes. Accordingly, there exists a need for improvements in security processes. Preferably, improvements should be applicable to other multi-access technologies and the telecommunication standards that employ these technologies.

SUMMARY

In an aspect of the disclosure, a method, a computer program product, and an apparatus are provided.

According to certain aspects, a method for wireless communication at user equipment (UE) includes establishing a connection with a serving network, transmitting a first message including an authentication credential that includes a randomly selected key encryption key (KEK) and a serving network identifier to a network node of the serving network, where the authentication credential is encrypted using an encryption key of a Home Subscriber Server (HSS) in a home network, receiving a second message responsive to the first message, where the second message includes an authentication request from the network node and a signature generated by the network node using the KEK, and authenticating the network node based on the signature.

According to certain aspects, a method for wireless communication at a mobility management entity (MME) in a serving network includes receiving a first request from a UE to establish a connection with the serving network, the first request including a unique identifier of the UE and encrypted information. The encrypted information includes an identifier of the serving network and a randomly selected key encryption key (KEK) and the method further includes transmitting a second request to an HSS of a home network associated with the UE, the request including the encrypted information received in the first request and a public key of the MME. The method further includes receiving from the HSS a response to the second request, the response to the second request including the KEK encrypted using a public key of the MME, and an authentication vector that is encrypted using the KEK, decrypting the KEK using a private key corresponding to the public key of the MME, decrypting the authentication vector using the KEK, and sending a third request to the UE, the third request including an authentication request signed using the KEK.

According to certain aspects, a method for wireless communication at an HSS in a home network of a UE includes receiving an authentication information request from node of a serving network, where the request includes a first serving network identifier, a public key of the node of the serving network, and information encrypted by the UE. The information encrypted by the UE includes a randomly selected KEK and a second serving network identifier. The method further includes using a private key of the HSS to decrypt the second serving network identifier and the KEK from the information encrypted by the UE, and comparing the first serving network identifier with the second serving network identifier. When the first serving network identifier matches the second serving network identifier, the method includes encrypting the KEK using the public key of the node of the serving network to obtain an encrypted KEK, encrypting an authentication vector using the KEK to obtain an encrypted authentication vector, and sending a response to the authentication information request, where the response includes the encrypted KEK and the encrypted authentication vector.

According to certain aspects, an apparatus includes means for establishing a connection between a UE and a serving network, means for communicating a first message to a HSS in a home network associated with the UE, where the first message includes an authentication credential encrypted by the UE using an encryption key of the HSS, and means for authenticating the network node based on a comparison of a first identification of the serving network provided by the serving network and a second identification of the serving network provided in the authentication credential. The HSS may be configured to decrypt the authentication credential to obtain the second identification and a KEK provided by the UE, and to provide a version of the KEK to a network node of the serving network that is encrypted using a public key of the network node. The means for authenticating the network node may be configured to authenticate the network node after the network node has transmitted to the UE an authentication request signed using the KEK.

DETAILED DESCRIPTION

Figure 1:
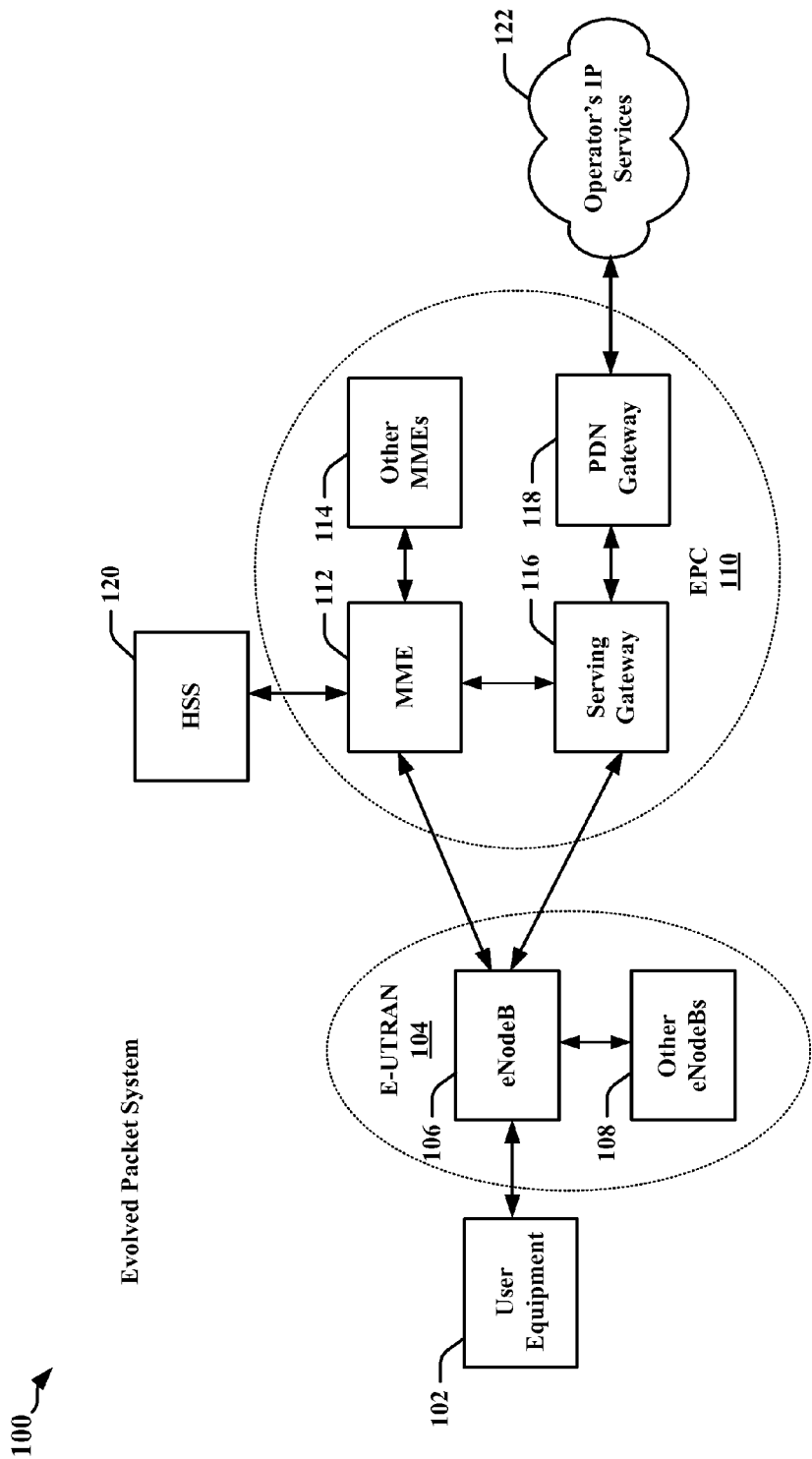
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a computer or "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Computer-readable media may include transitory and non-transitory storage media that may be read and/or manipulated by one or more processors. Storage media may be any available media that can be accessed by a computer. By way of example, and not limitation, such computer-readable media can comprise random access memory (RAM), read only memory (ROM), programmable ROM (PROM), erasable PROM (EPROM), electrically erasable PROM (EEPROM), compact disc read only memory (CD-ROM), or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Certain aspects disclosed herein relate to systems and methods by which radio link setup and/or bearer establishment processes may be secured. Certain aspects of the disclosure address security issues that may arise in newer generations of radio access technologies (RATs), including in fifth generation (5G) and later networks, as well as in fourth generation (4G) and earlier networks. The configuration and operation of a 4G LTE network architecture is described herein by way example, and for the purpose of simplifying descriptions of certain aspects that may apply to multiple RATs.

FIG. 1 is a diagram illustrating an LTE network architecture 100. The LTE network architecture 100 may be referred to as an Evolved Packet System (EPS). The EPS may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control planes protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), an eNB, or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a virtual reality device, a tablet computing device, a media player, an appliance, a gaming device, a wearable computing device such as a smartwatch or optical head-mounted display, or any other similarly functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an "S1" interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110.

Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
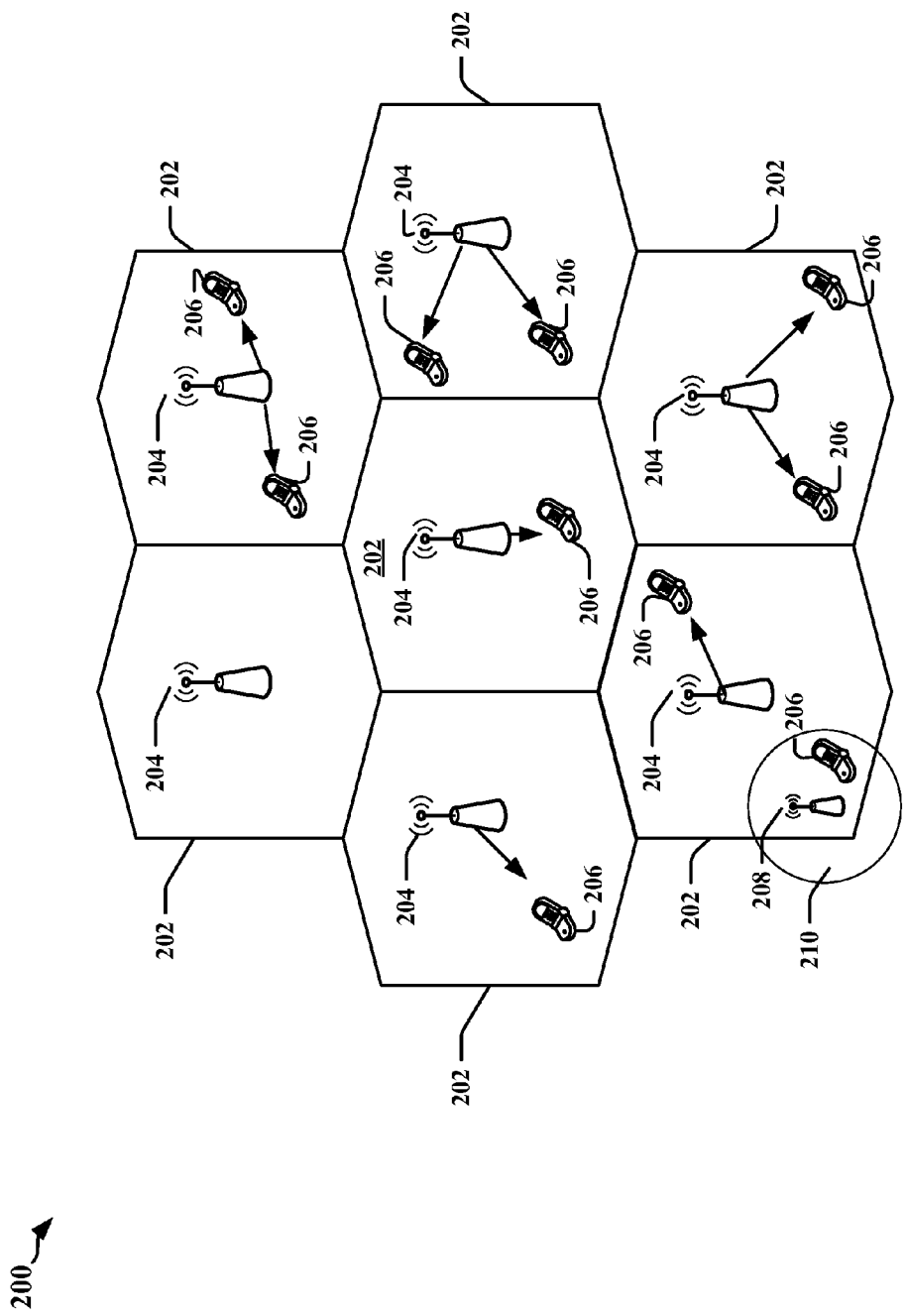
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower-power class eNodeBs 208 may have cellular regions 210 that overlap with one or more of the cells 202. The lower-power class eNodeB 208 may be a femto cell (e.g., home eNodeB (HeNB)), pico cell, micro cell, or remote radio head (RRH). The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
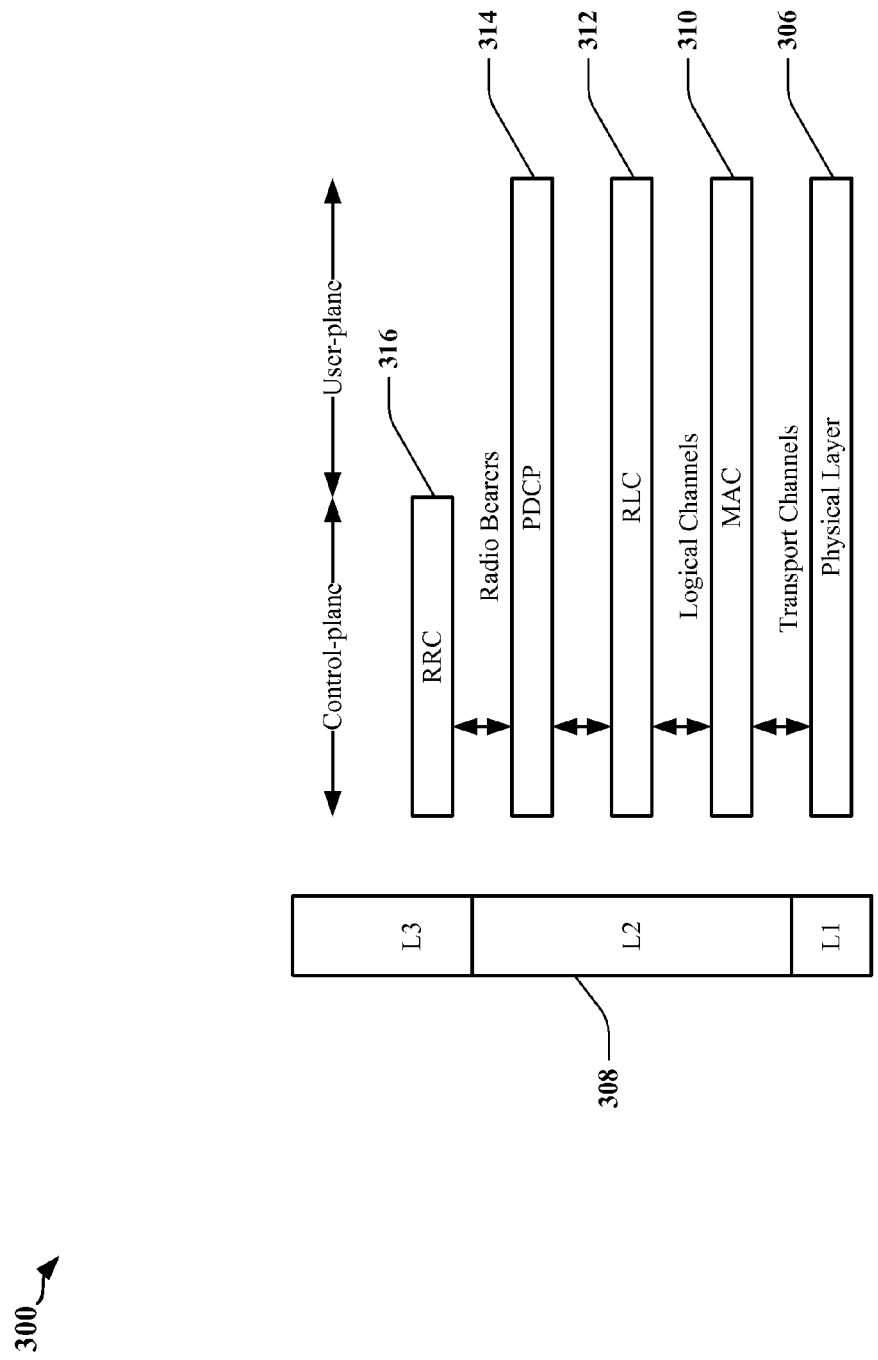
FIG. 3 is a diagram illustrating an example of a radio protocol architecture for the user and control planes.

FIG. 3 is a diagram 300 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 306. Layer 2 (L2 layer) 308 is above the physical layer 306 and is responsible for the link between the UE and eNodeB over the physical layer 306.

In the user plane, the L2 layer 308 includes a media access control (MAC) sublayer 310, a radio link control (RLC) sublayer 312, and a packet data convergence protocol (PDCP) sublayer 314, which are terminated at the eNodeB on the network side. Although not shown, the UE may have several upper layers above the L2 layer 308 including a network layer (e.g., IP layer) that is terminated at the PDN gateway 118 on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNodeBs. The RLC sublayer 312 provides segmentation and reassembly of upper layer data packets, retransmission of lost data packets, and reordering of data packets to compensate for out-of-order reception due to hybrid automatic repeat request (HARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

In the control plane, the radio protocol architecture for the UE and eNodeB is substantially the same for the physical layer 306 and the L2 layer 308 with the exception that there is no header compression function for the control plane. The control plane also includes a radio resource control (RRC) sublayer 316 in Layer 3 (L3 layer). The RRC sublayer 316 is responsible for obtaining radio resources (i.e., radio bearers) and for configuring the lower layers using RRC signaling between the eNodeB and the UE.

Figure 4:
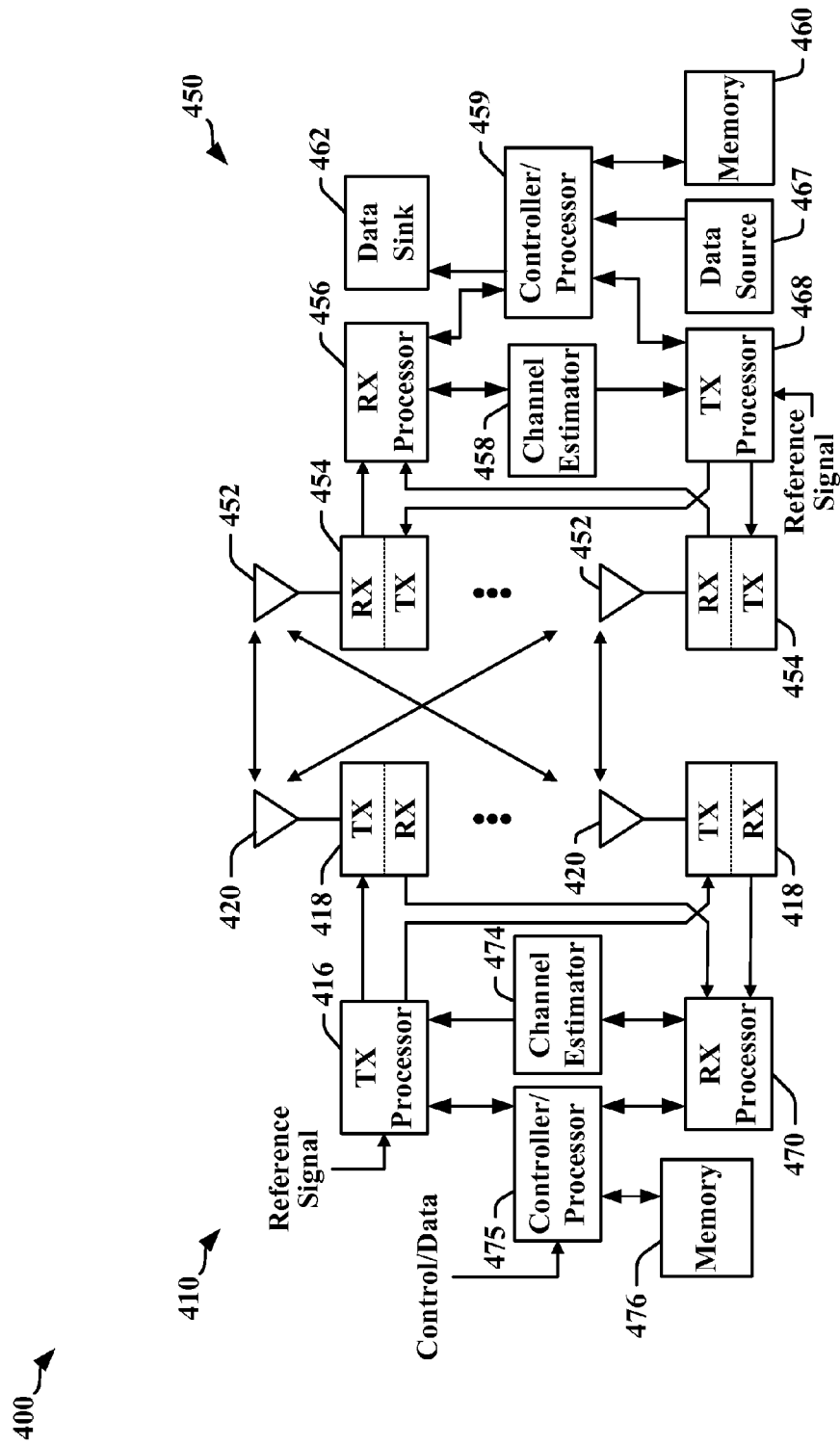
FIG. 4 is a diagram illustrating an example of an evolved Node B and user equipment in an access network.

FIG. 4 is a block diagram of an eNodeB 410 in communication with a UE 450 in an access network. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the UE 450 based on various priority metrics. The controller/processor 475 is also responsible for HARQ operations, retransmission of lost packets, and signaling to the UE 450.

The transmit (TX) processor 416 implements various signal processing functions for the L1 layer (i.e., physical layer). The signal processing functions include coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream is then provided to a different antenna 420 via a separate transmitter 418TX. Each transmitter 418TX modulates an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 performs spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNodeB 410. These soft decisions may be based on channel estimates computed by the channel estimator 458. The soft decisions are then decoded and deinterleaved to recover the data and control signals that were originally transmitted by the eNodeB 410 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the eNodeB 410, the controller/processor 459 implements the L2 layer for the user plane and the control plane by providing header compression, ciphering, packet segmentation and reordering, and multiplexing between logical and transport channels based on radio resource allocations by the eNodeB 410. The controller/processor 459 is also responsible for HARQ operations, retransmission of lost packets, and signaling to the eNodeB 410.

Channel estimates derived by a channel estimator 458 from a reference signal or feedback transmitted by the eNodeB 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RF carrier with a respective spatial stream for transmission.

The UL transmission is processed at the eNodeB 410 in a manner similar to that described in connection with the receiver function at the UE 450. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the UE 450. Upper layer packets from the controller/processor 475 may be provided to the core network. The controller/processor 475 is also responsible for error detection using an ACK and/or NACK protocol to support HARQ operations.

Bearer Setup in LTE Networks

Radio link setup in an LTE network may involve establishment of one or more radio bearers between an access node that provides access to a network and a communication device. Radio link setup typically includes a security activation exchange. A session bearer, which may be a logical bearer or logical channel, may then be established over the radio link and one or more services and/or communications may be established over the session bearer. The session bearer, services and/or communications may be secured by one or more security keys.

As part of the session bearer setup, an authentication request, and/or one or more key exchanges may take place. In networks operating according to an LTE-compatible protocol, keys may be derived by the communication device based on algorithms provided by one or more network entities.

Example of E-UTRAN Key Hierarchy

Figure 5:
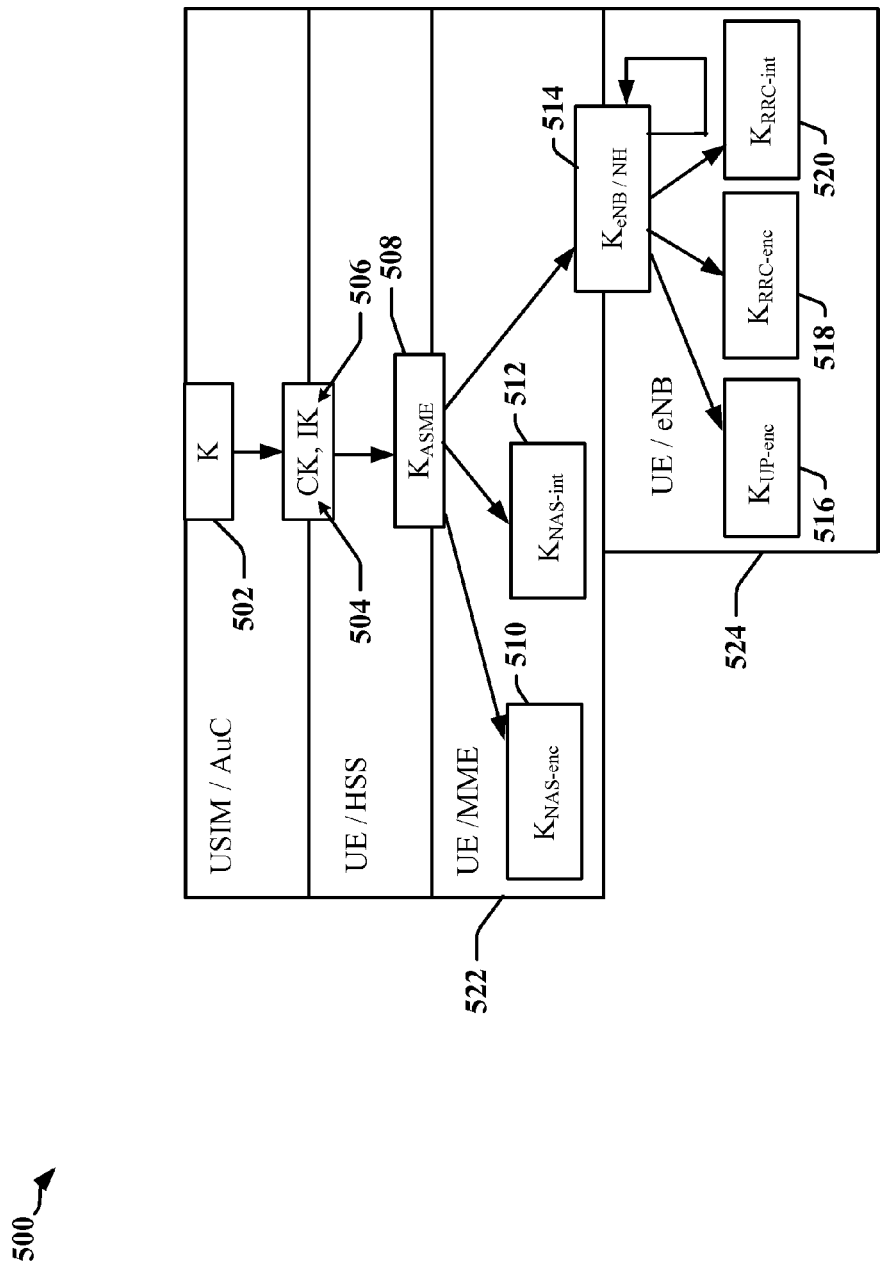
FIG. 5 illustrates an example of an E-UTRAN key hierarchy that may be implemented within an LTE network.

FIG. 5 illustrates a typical E-UTRAN key hierarchy 500 that may be implemented within a typical LTE network. In the communication device, a Universal Subscriber Identity Module (USIM) and an Authentication Center (AuC) in a network entity at the network side use a master key (K) 502 to generate a cipher key (CK) 504 and integrity key (IK) 506. The cipher key (CK) 504 and integrity key (IK) 506 may then be used by the communication device and a Home Subscriber Server (HSS) in the network entity to generate an Access Security Management Entity key ($K_{ASME}$) 508. The security activation of a communication device operating in an LTE network may be accomplished through an Authentication and Key Agreement procedure (AKA), Non-Access Stratum (NAS) Security Mode Configuration (NAS SMC) and Access Stratum (AS) Security mode Configuration (AS SMC). AKA is used to derive the $K_{ASME}$ 508, which is then used as a base key for the calculation of NAS keys 510 and 512 and AS keys 514, 516, 518, and 520. The communication device and an MME at the network side may then use the $K_{ASME}$ 508 to generate one or more of these security keys.

Figure 6:
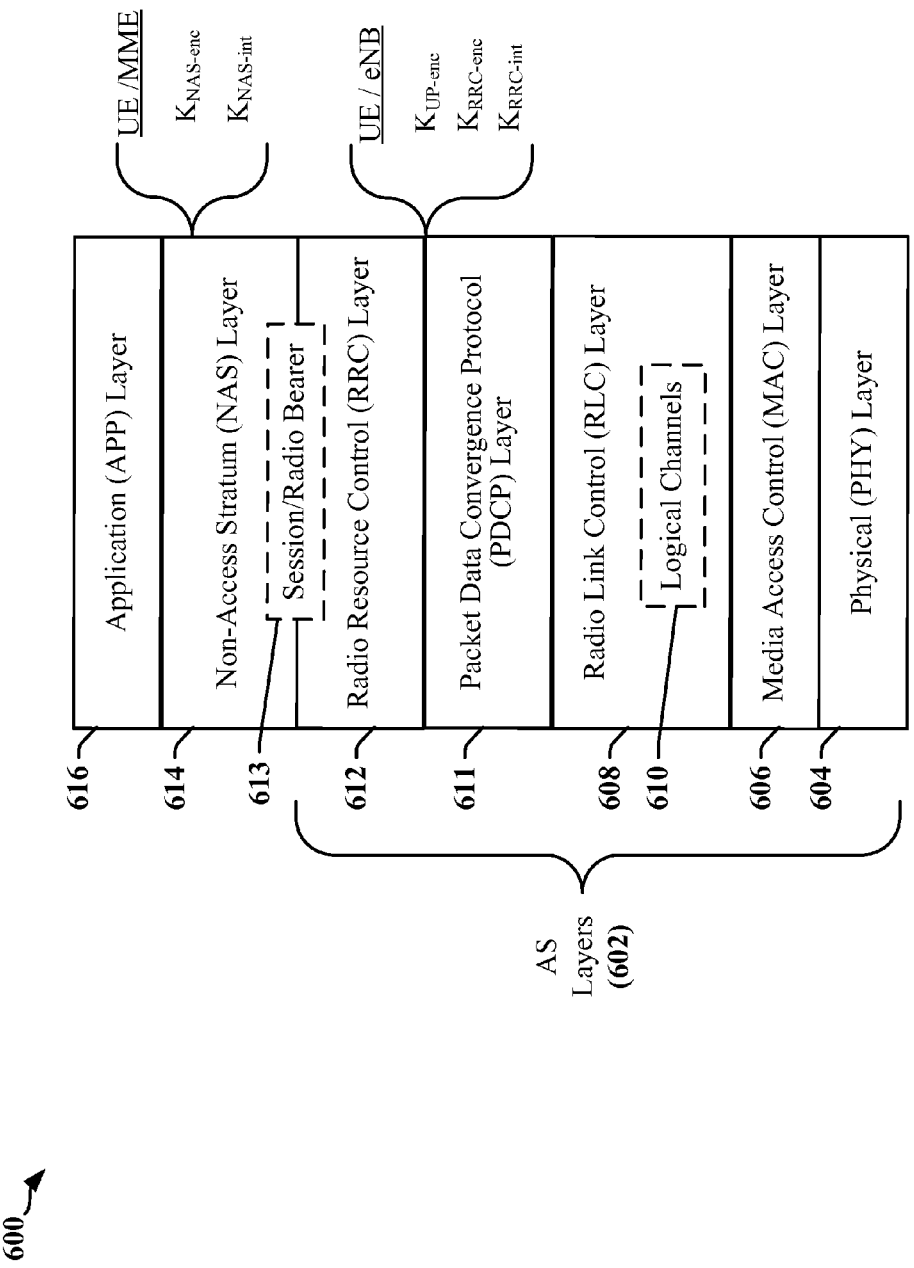
FIG. 6 illustrates an example of a protocol stack that may be implemented in a communication device operating in a LTE packet-switched network.

LTE packet-switched networks may be structured in multiple hierarchical protocol layers, where the lower protocol layers provide services to the upper layers and each layer is responsible for different tasks. For example, FIG. 6 illustrates an example of a protocol stack 600 that may be implemented in a communication device operating in a LTE packet-switched network. In this example, an LTE protocol stack 600 includes a Physical (PHY) Layer 604, a Media Access Control (MAC) Layer 606, a Radio Link Control (RLC) Layer 608, a Packet Data Convergence Protocol (PDCP) Layer 611, a RRC Layer 612, a NAS Layer 614, and an Application (APP) Layer 616. The layers below the NAS Layer 614 are often referred to as the Access Stratum (AS) Layer 602.

The RLC Layer 608 may include one or more channels 610. The RRC Layer 612 may implement various monitoring modes for the UE, including connected state and idle state. The NAS Layer 614 may maintain the communication device's mobility management context, packet data context and/or its IP addresses. Note that other layers may be present in the protocol stack 600 (e.g., above, below, and/or in between the illustrated layers), but have been omitted for the purpose of illustration. Radio/session bearers 613 may be established, for example at the RRC Layer 612 and/or NAS Layer 614. Consequently, the NAS Layer 614 may be used by the communication device and an MME to generate the security keys $K_{NAS-enc}$ 510 and $K_{NAS-int}$ 512. Similarly, the RRC Layer 612 may be used by the communication device and an eNodeB to generate the security keys $K_{UP-enc}$ 516, $K_{RRC-enc}$ 518, and $K_{RRC-int}$ 520. While the security keys $K_{UP-enc}$ 516, $K_{RRC-enc}$ 518, and $K_{RRC-int}$ 520 may be generated at the RRC Layer 612, these keys may be used by the PDCP Layer 611 to secure signalling and/or user/data communications. For instance, the key $K_{UP-enc}$ 516 may be used by the PDCP Layer 611 to secure for user/data plane (UP) communications, while the keys $K_{RRC-enc}$ 518, and $K_{RRC-int}$ 520 may be used to secure signalling (i.e., control) communications at the PDCP Layer 611.

In one example, prior to establishing these security keys (keys $K_{NAS-enc}$ 510, $K_{NAS-int}$ 512, $K_{UP-enc}$ 516, $K_{RRC-enc}$ 518, and/or $K_{RRC-int}$ 520), communications to/from a communication device may be transmitted (unprotected or unencrypted) over an unsecured common control channel (CCCH). After these security keys are established, these same user data and/or control/signaling communications may be transmitted over a Dedicated Control Channel (DCCH).

During the connection setup/session bearer setup procedures in an LTE-compatible network, AKA and NAS SMC procedures are optional if there is an existing native NAS security context already present from the previous setup sessions. The existing NAS context may be reused at the time of Service Request, Attach Request and Tracking Area Update (TAU) Request. TAU requests may be sent periodically by a UE or when the UE enters a tracking area that was not associated with the UE, where the tracking area (or routing area) may be an area in which a UE is able to move without first updating the network.

Security keys used for ciphering and integrity algorithms, both at the AS (User plane and RRC) and NAS may be derived using an individual algorithm identity provided as one of the inputs. At the NAS level (e.g., NAS Layer 614), this is provided to the communication device by the access node (eNodeB) in NAS Security Mode Command during the NAS SMC procedure. At the AS level, the algorithms to be used are provided by the Radio Resource Control (RRC) Security Mode Command. Key generation may be done with a key derivation function (KDF), such as the HMAC-SHA-256 function. In generating the NAS security keys $K_{NAS\text{-}enc}$ 510 and integrity key $K_{NAS\text{-}int}$ 512 and RRC security keys $K_{UP\text{-}enc}$ 516, $K_{RRC\text{-}enc}$ 518, and integrity key $K_{RRC\text{-}int}$ 520, the key derivation function KDF takes several types of inputs, including an input algorithm identity provided by the network during a security activation exchange. For instance, the input algorithm identity may identify either Advanced Encryption Standard (AES) or "SNOW-3G."

It should be noted that, in some implementations, all security keys (e.g., NAS ciphering and integrity keys and RRC ciphering and integrity keys) are generated using the same key derivation function (KDF), e.g., HMAC-SHA-256, that uses a root/base key (e.g., $K_{ASME}$), one or more fixed inputs, and one of the plurality of possible input algorithm identities (i.e., security key=KDF(root/base key, fixed input(s), algorithm identity)).

An Example of an AKA Procedure

Figure 7:
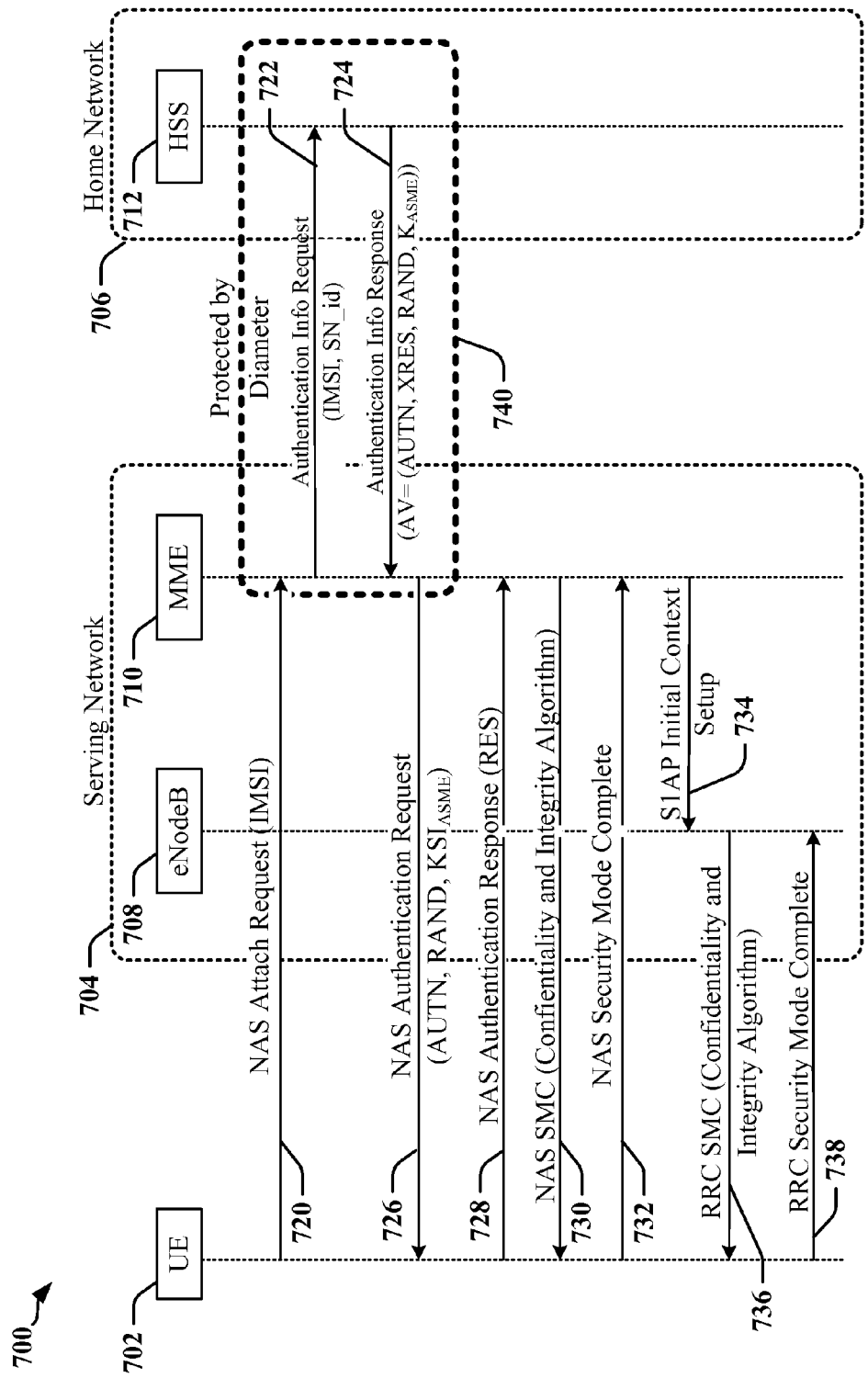
FIG. 7 is a message flow diagram illustrating an example of authentication in an LTE wireless network.

FIG. 7 is a message flow diagram 700 that illustrates an example of authentication in an LTE wireless network. A UE 702 may connect to the network through a serving network 704 in order to obtain services from a home network 706 provided by a network operator. During bearer setup, the UE 702 may establish a secured connection with an HSS 712 of the home network 706. The UE 702 may trust the HSS 712, while the eNodeB 708 of the serving network 704 may be untrusted. The UE 702 may transmit a NAS Attach Request 720 with identifying information such as an International Mobile Subscriber Identity (IMSI). The MME 710 receives the NAS Attach request 720 and forwards the request 720 in an Authentication Information Request message 722 to the HSS 712. The Authentication Information Request message 722 may include the IMSI of the UE 702 and a serving network identifier (SN_id). The HSS 712 may respond with an Authentication Information Response message 724 that includes an authentication value (AUTN), an expected result value (XRES) a random number and a $K_{ASME}$. The AUTN is generated by an AuC and, together with the RAND, authenticates the HSS 712 to the UE 702. The messages 722, 724 between the MME 710 and the HSS 712 are communicated on a link 740 and protected an authentication, authorization, and accounting protocol (Diameter).

The MME 710 transmits a NAS Authentication Request 726 to the UE 702, which responds with a NAS Authentication Response message 728. The NAS Authentication Request 726 includes the AUTN, RAND and a Key Set Identifier ($KSI_{ASME}$). The MME 710 may transmit a Non-Access Stratum (NAS) Security Mode Configuration (NAS SMC) message 730 to the UE 702. The UE 702 then transmits an "NAS Security Mode Complete" message 732 to the MME 710, which signals the eNodeB 708 an "S1AP Initial Context Setup" message 734. The eNodeB 708 may then transmit an RRC Non-Access Stratum (NAS) Security Mode Configuration (RRC SMC) message 736 to the UE 702, which responds with an RRC Security Mode Complete message 738 when ready.

In certain network implementations, the serving network 704 is trusted for some period of time after authentication has been accomplished. In one example, the serving network 704 may be trusted after authentication until another authentication process (AKA) is performed with the HSS 712. The duration of time that established trust survives may be determined by a network operator. The network operator may configure the period of trust to endure for a number of hours, days, or weeks.

Examples of Security Concerns in Evolving Network Technologies

Due to development of 4G, 5G, and other networking technologies, certain network functions may be pushed towards the network edge. For example, network functions associated with an MME may be collocated with network functions of an eNodeB in small cells. In some instances, the relocation of one or more network functions can degrade or invalidate trust on a cellular core network.

In one example, a femtocell or home eNodeB (HeNB) may be deployed to provide localized wireless service from through a broadband connection. A femtocell may be characterized as a small, low-power cellular base station, typically designed for use in a home or small business environment. A femtocell may be any small cell, typically with limited range and/or a limited number of active attached UEs that connects to a network operator's network through a wide area network or connection. The femtocell may be operable in one or more networks, including WCDMA, GSM, CDMA2000, TD-SCDMA, WiMAX and LTE networks. The deployment of newer technologies and/or the use of femtocells may result in the handling of network functions in less protected and/or isolated locations that are more susceptible to attack. For these and other reasons, the level of security provided by a small cell or relay node may be significantly degraded with respect to the security provided by a macro cell. Increased deployment of small cells, and relays to support for multiple hops within a network can be expected.

In another example, network functions in certain newer technologies may be located in shared systems, and/or provided in a cloud environment. In such systems and environments, networking and computing functions may be virtualized, and often managed by a third party provider. While network operators may be capable of securing access paths to the cloud, security of the cloud interior cannot be guaranteed. In some instances, tradeoffs are made between internal security of the virtual (cloud) environment and virtualized system performance. In some instances, network operators need not own the network equipment used to connect UEs, and/or the different components of network equipment in a network may be owned by different operators. Reduced isolation between operators may result, and some network operators may have easier access to other network operator's credentials. For example, credentials of a first network operator may be more easily misappropriated by a second network operator when both network operators share a common eNodeB or MME.

Networks may be implied to be insecure when certain security assumptions are invalidated. In 4G AKA, for example, the HSS is a trusted network entity, and the HSS may be a root of trust. Mutual authentication between a UE and a serving network may depend on the security between the HSS and the serving network. The HSS authenticates the serving network on behalf of UE and provides the authentication credentials for the UE to the serving network through a secure channel.

Figure 8:
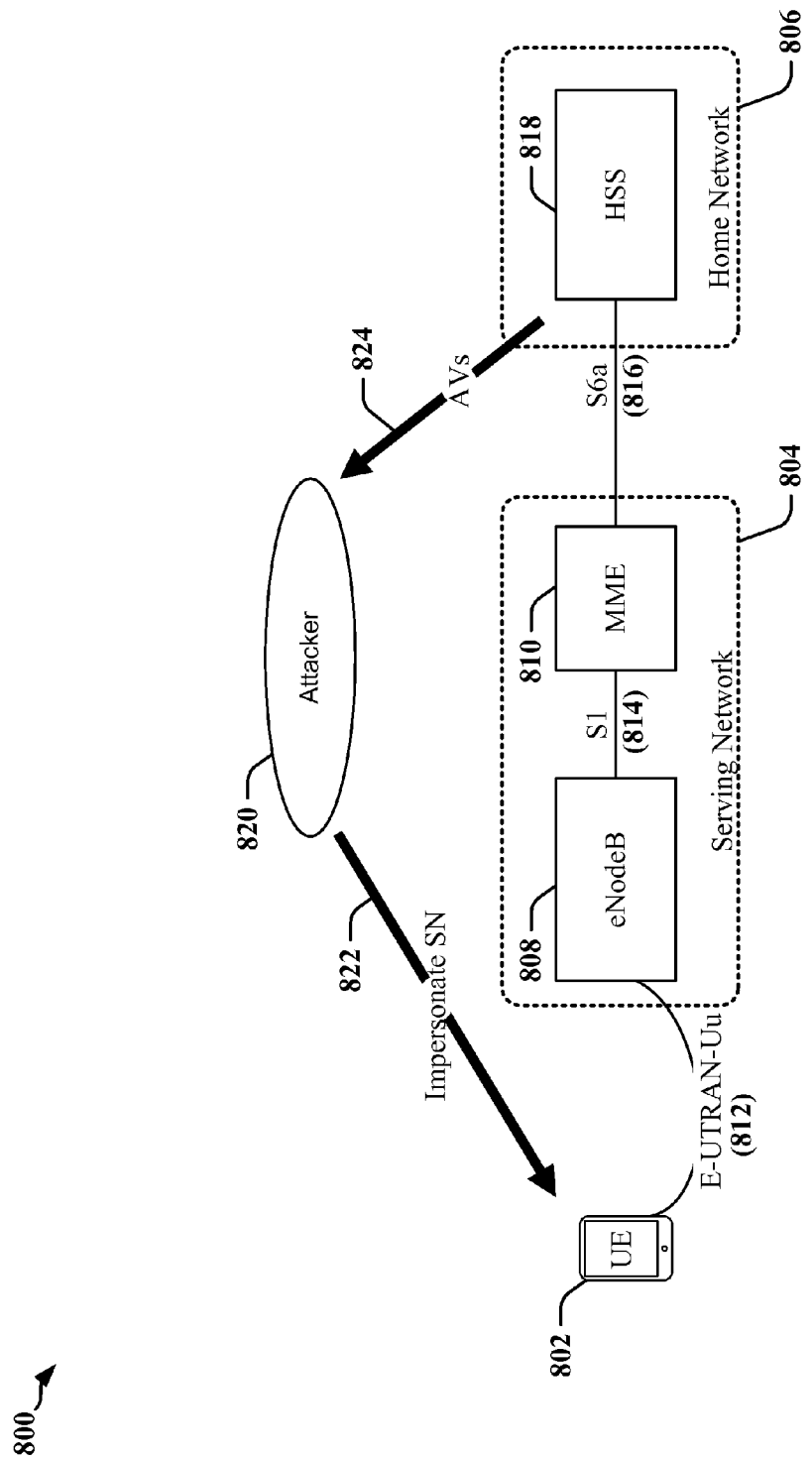
FIG. 8 is a diagram illustrating an example of vulnerability in an LTE wireless network.

Referring to FIG. 8, the communication channel (the S6a reference point) 816 between an HSS 818 and the serving network 804 is assumed to be secure and, in some examples, is protected by an authentication, authorization, and accounting protocol such as the Diameter protocol, which provides cryptographic capabilities through its Transport Layer Security (TLS) protocols. In some instances, the communication channel 816 between the HSS 818 and an MME 810 may be insufficiently secure, and in some instances, the S6a reference point 816 is not protected. Security issues may arise, for example, when the MME 810 is physically located in a less secure environment, including when the MME 810 is collocated with the eNodeB 808 in a public space, or located within a cloud computing or networking environment. Threats arise because credentials for the UE 802, including Authentication Vectors (AVs) 824 in transmissions to the MME 810 can be intercepted by an attacker 820. In such environments, a secure connection between the HSS 818 and the MME 810 does not necessarily imply that an authentication information request is legitimate. For example, the secure connection may be handled by a proxy server that does not perform sanity checks for upper-layer protocols.

Figure 9:
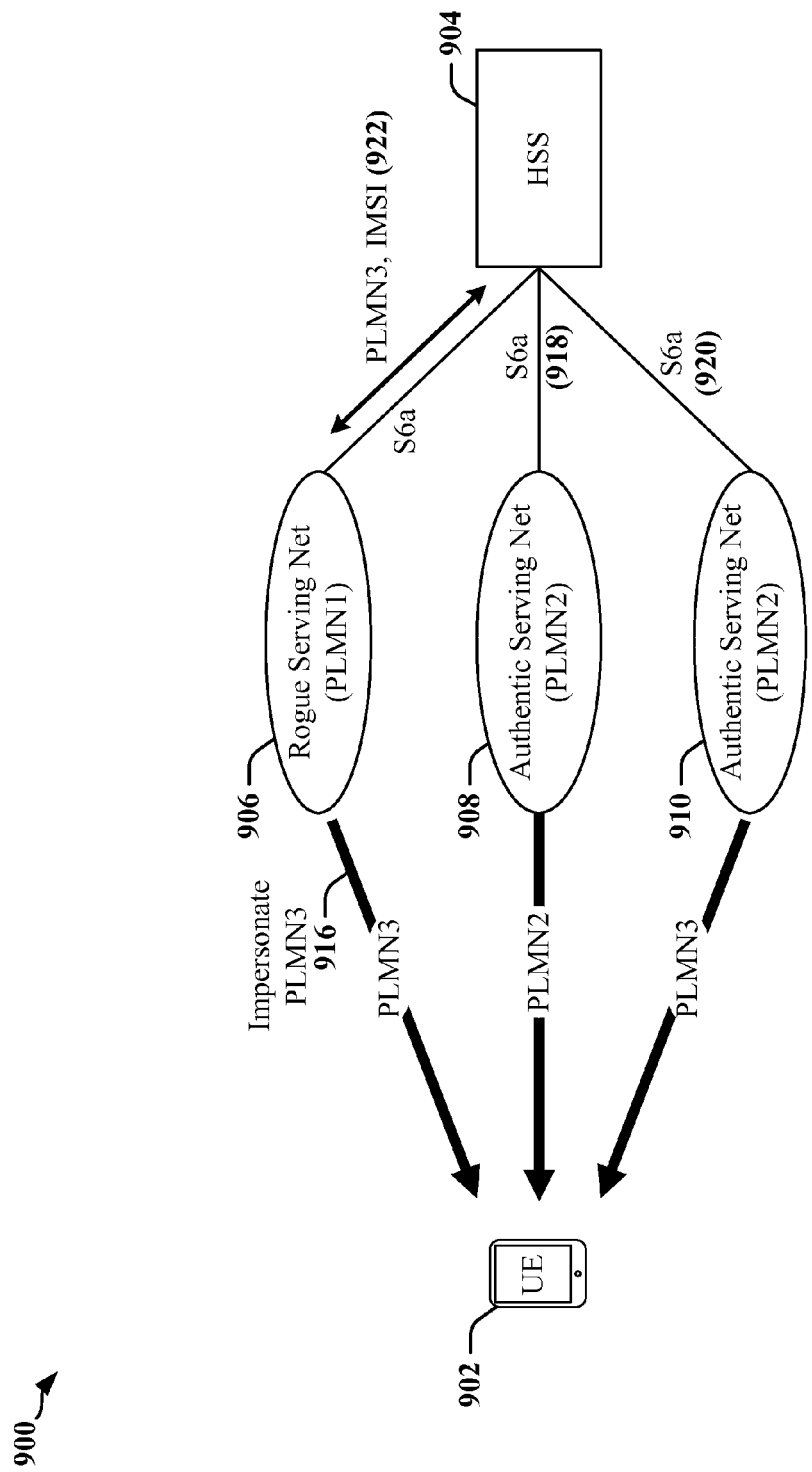
FIG. 9 is a diagram illustrating an example of impersonation in an LTE wireless network.

FIG. 9 illustrates one scenario in which a rogue public land mobile network (PLMN) 906 can impersonate one or more other PLMNs 908, 910 provided by valid network operators. As illustrated in FIG. 8, vulnerabilities in communications channels 918, 920 between the HSS 904 and legitimate serving PLMNs 908 and 910 may be exploited such that a rogue PLMN 906 may monitor the communications channels 918, 920 in order to capture IMSI and key information 922 transmitted between the HSS 904 and a valid PLMN 910. In some instances, an MME in the rogue PLMN 906 may impersonate an MME in the valid PLMN 910 in order to establish a communications link 916 with a UE 902 based on captured UE authentication vectors. Network entities in the rogue PLMN 906 may then have access to the information on the UE 902 and may monitor communications originating from the UE 902.

Examples of Improved Serving Network Authentication

According to certain aspects disclosed herein, and with continued reference to FIG. 8, impersonation attacks may be avoided by treating only the HSS 818 as a trusted entity. The UE 802 may provide the HSS 818 with a key that can be used to encrypt a credential (i.e., an AV). The HSS 818 may encrypt the credential for the UE 802 using the provided key. The HSS 818 may encrypt the key such that only an intended MME 810 can decrypt the key. The intended MME 810 may be identified and/or registered with the HSS 818 through network operations. The MME 810 may decrypt the key and then decrypt the credentials for the UE 802. Accordingly, the MME 810 may prove knowledge of the key to UE 802. In this manner, the UE 802 may directly and explicitly authenticate the serving network 804 without relying on additional security protocols such as the Diameter protocol.

Figure 10:
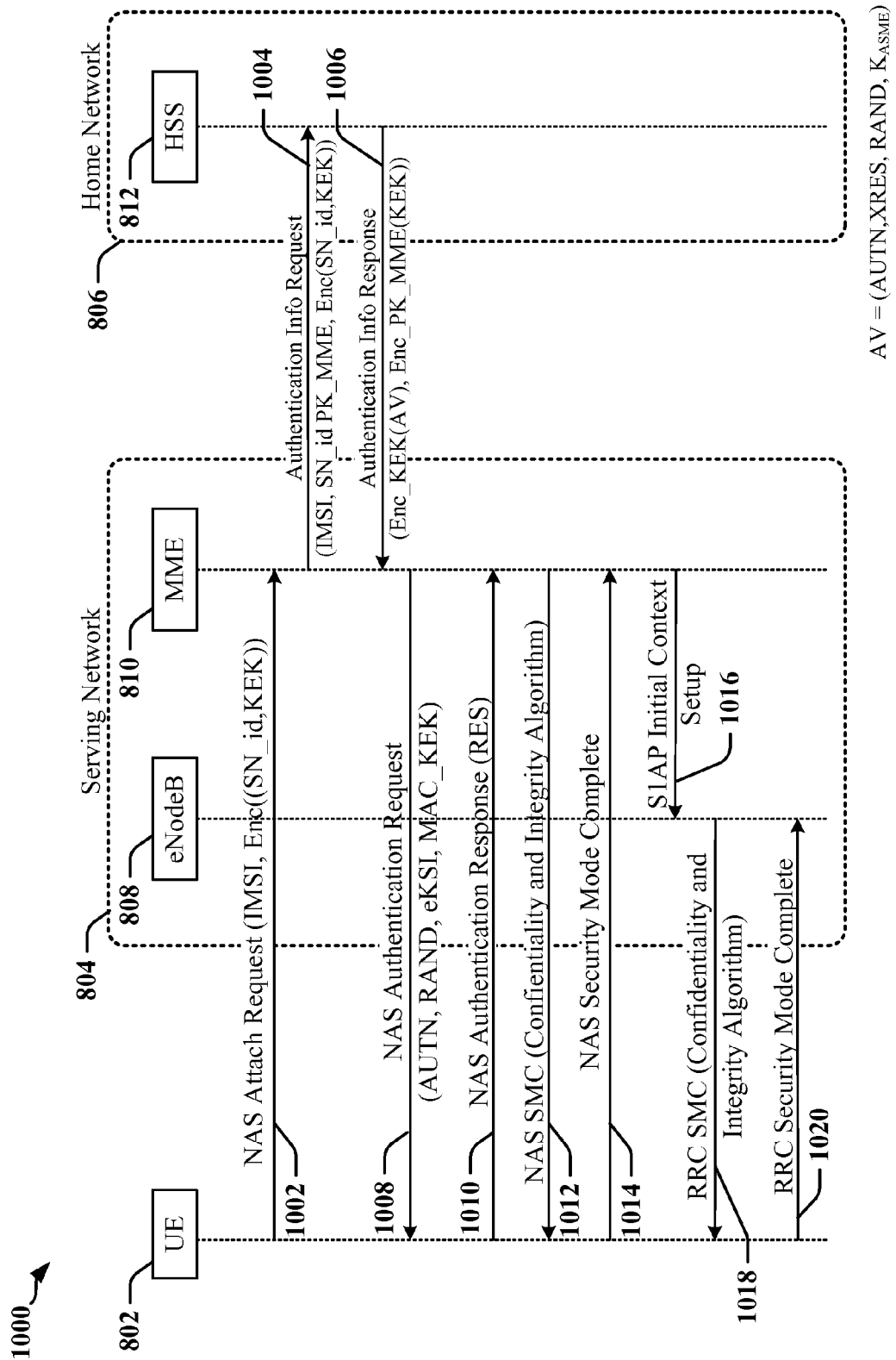
FIG. 10 is a message flow diagram illustrating an example of an authentication process according to certain aspects disclosed herein.

FIG. 10 is a message flow diagram 1000 that illustrates an example of authentication in a wireless network in which the UE 802 directly and explicitly authenticates the serving network 804. The wireless network may be an LTE or 5G network or some derivative thereof. The UE 802 may connect to a serving network 804 in order to obtain services from a home network 806 provided by a network operator. During bearer setup, the UE 802 may establish a secured connection with an HSS 818 of the home network 806. The UE 802 may trust the HSS 818, while the eNodeB 808 and MME 810 of the serving network 804 may be untrusted. The UE 802 may send a NAS Attach Request 1002 with its IMSI and information including a serving network identifier (SN_id) and a randomly selected key encryption key (KEK). Public or shared key encryption may be used to encrypt information in the NAS Attach Request 1002. If public key encryption is used, the IMSI, SN_id, and KEK may be encrypted using the public key of the HSS 818. If shared key encryption is used, the SN_id and KEK may be encrypted using a secret key shared between the UE 802 and the HSS 818. The SN_id sent by the UE 802 reflects the identity of the serving network to which connection is requested by the UE 802.

The MME 810 receives the NAS Attach Request 1002 and sends an Authentication Information Request 1004 to the HSS 818. The Authentication Information Request 1004 may include the encrypted information provided in the NAS Attach Request 1002, the SN_id of the network to which the MME 810 belongs, and a MME certificate, which may be a public key (PK_MME) of the MME 810. The certificate for the MME 810 may be signed by the network operator. The HSS 818 may decrypt the KEK and the SN_id from the encrypted information provided in the NAS Attach Request 1002. The HSS 818 may compare the latter decrypted SN_id with the SN_id sent by the MME 810 in the Authentication Information Request 1004. If the two SN_ids match, the HSS 818 prepare and transmit an Authentication Information Response 1006. The Authentication Information Response 1006 may include an encrypted version of the KEK, which is encrypted using the public key (PK_MME) of the MME 810. The Authentication Information Response 1006 may also include authentication vectors that are encrypted using the KEK.

The MME 810 receives the Authentication Information Response 1006 and uses its private key to decrypt the KEK in the Authentication Information Response 1006. The MME 810 may then decrypt the authentication vectors in the Authentication Information Response 1006 using the KEK. The MME 810 may then transmit a NAS Authentication Request 1008 to the UE 802 in which integrity is protected by the KEK. The Authentication Request 1008 includes authentication parameters (AUTN, RAND, eKSI), where the AUTN parameter is an authentication token, the RAND parameter is a random or pseudorandom number, and the eKSI parameter is an evolved Key Set Identifier provided by the MME 810. The Authentication Request 1008 includes a signature or Message Authentication Code (MAC_KEK) created over the message using the KEK. The UE 802 responds with a NAS Authentication Response message 1010.

The MME 810 may transmit a NAS security mode command (SMC) message 1012 to the UE 802 to activate AS security prior to the establishment of certain radio bearers. The UE 802 responds by transmitting a "NAS Security Mode Complete" message 1014 to the MME 810, which signals the eNodeB 808 an "S1AP Initial Context Setup" message 1016. S1AP provides the signaling service between the E-UTRAN 104 and the evolved packet core (EPC) 110 (see FIG. 1). The eNodeB 808 may then transmit an RRC SMC message 1018 to the UE 802, which responds with an "RRC Security Mode Complete" message 1020 when ready.

Figure 11:
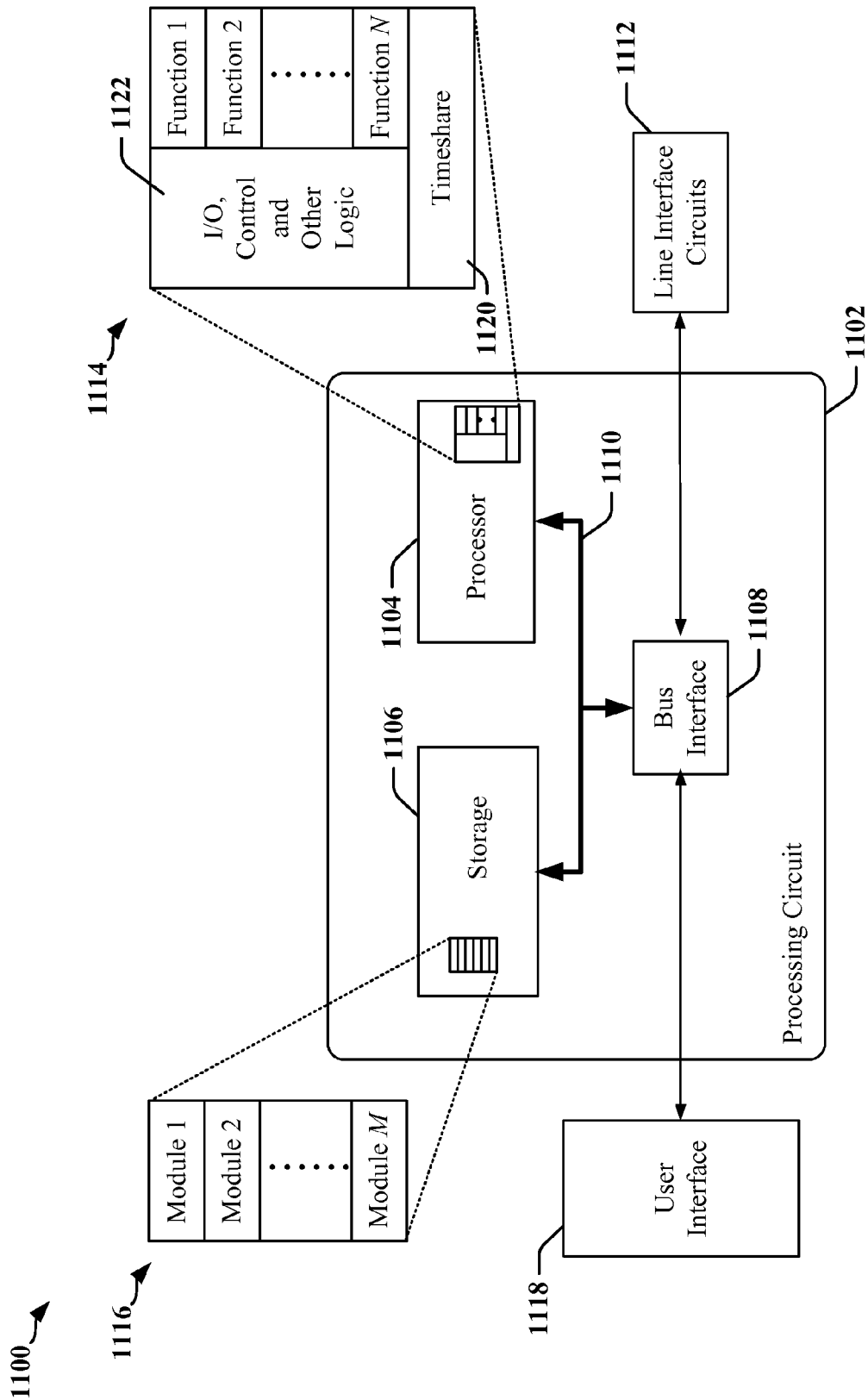
FIG. 11 is a block diagram illustrating an example of an apparatus employing a processing circuit that may be adapted according to certain aspects disclosed herein.

FIG. 11 is a conceptual diagram 1100 illustrating a simplified example of a hardware implementation for an apparatus employing a processing circuit 1102 that may be configured to perform one or more functions disclosed herein. In accordance with various aspects of the disclosure, an element, or any portion of an element, or any combination of elements as disclosed herein may be implemented using the processing circuit 1102. The processing circuit 1102 may include one or more processors 1104 that are controlled by some combination of hardware and software modules. Examples of processors 1104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112. A transceiver 1112 may be provided for each networking technology supported by the processing circuit. In some instances, multiple networking technologies may share some or all of the circuitry or processing modules found in a transceiver 1112. Each transceiver 1112 provides a means for communicating with various other apparatus over a transmission medium. Depending upon the nature of the apparatus, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the transceiver 1112, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the transceiver 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

The following flowcharts illustrate methods and processes performed or operative on network elements adapted or configured in accordance with certain aspects disclosed herein. The methods and processes may be implemented in any suitable network technology, including 3G, 4G, and 5G technologies, to name but a few. Accordingly, the claims are not restricted to a single network technology. In this regard, a reference to a "UE" may be understood to refer also to a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A reference to an "eNodeB" may be understood to refer to a base station, a base transceiver station, a radio base station, a radio transceiver, a transceiver function, a basic service set, an extended service set, or some other suitable terminology. A reference to an MME may refer also to an entity that serves as an authenticator in the serving network and/or a primary service delivery node such as a Mobile Switching Center, for example. A reference to the HSS may refer also to a database that contains user-related and subscriber-related information, provides support functions in mobility management, call and session setup, and/or user authentication and access authorization, including, for example, a Home Location Register (HLR), Authentication Centre (AuC) and/or an authentication, authorization, and accounting (AAA) server.

Figure 12:
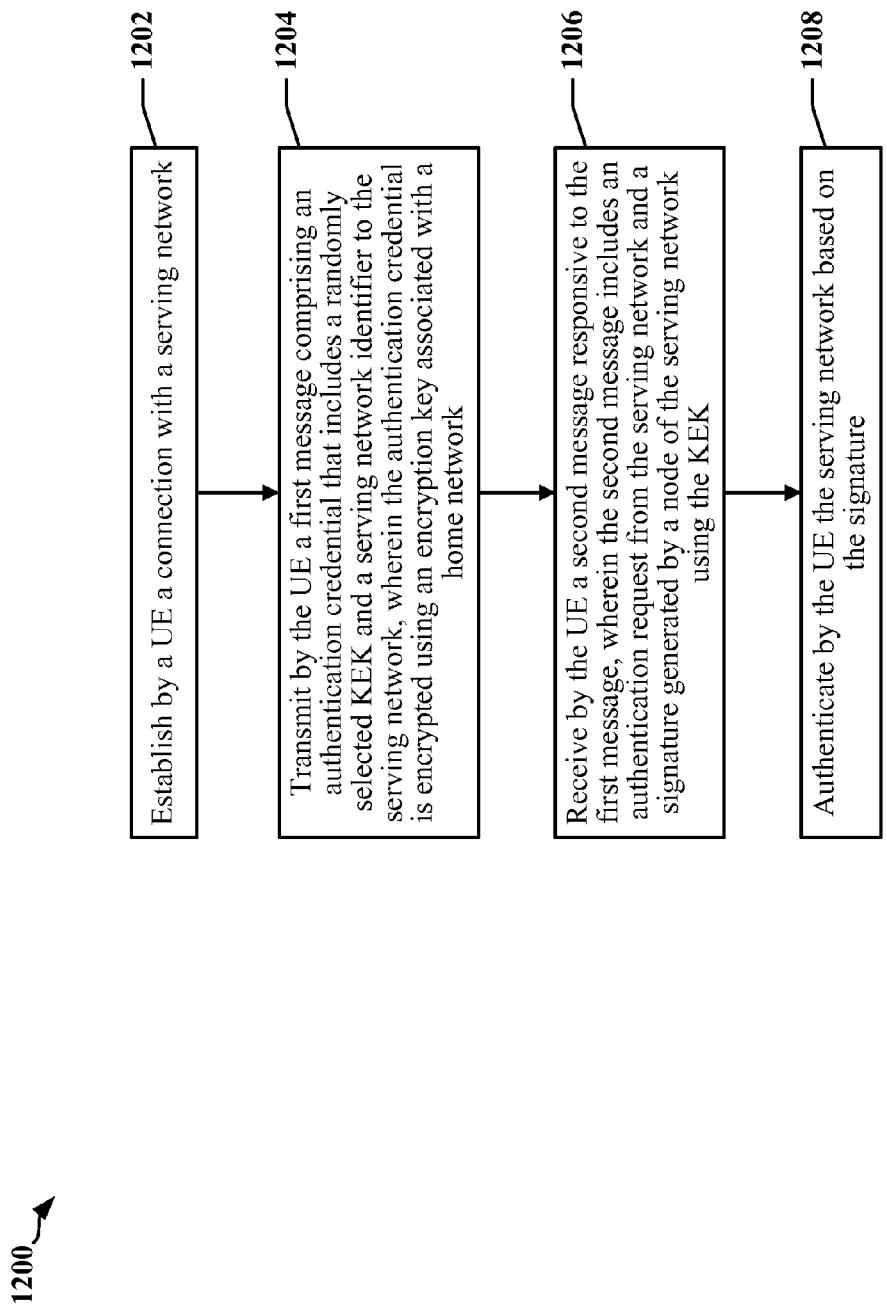
FIG. 12 is a flow chart of a method of wireless communication performed at a UE in accordance with certain aspects disclosed herein.

FIG. 12 is a flow chart 1200 of a method of wireless communication. The method may be performed by a UE. At block 1202, the UE may establish a connection with a serving network.

At block 1204, the UE may transmit an authentication credential in a first message that includes a randomly selected KEK and a serving network identifier to a network node of the serving network. The network node may be a MME. The authentication credential may be encrypted using an encryption key of an HSS in a home network. In some instances, the authentication credential may be encrypted using a symmetric cipher based on a key shared with the HSS. In some instances, the authentication credential may be encrypted using an asymmetric cipher based on a public key of the HSS.

At block 1206, the UE may receive a second message responsive to the first message. The second message may include an authentication request from the network node and a signature generated by the network node using the KEK. The second message may carry a message authentication code generated using the KEK.

The second message may be generated by an MME after the MME receives a response to an authentication information request transmitted to the HSS. The response to the authentication information request may be transmitted by the HSS to the MME and is encrypted using a public key of the MME.

At block 1208, the UE may authenticate the network node based on the signature.

In one example, the network node may be authenticated when the signature was generated using a copy of the KEK. The signature may have been generated using a copy of the KEK when the network node has received a copy of the KEK during an exchange of encrypted messages with the HSS that is initiated by the network node in response to the first message.

Figure 13:
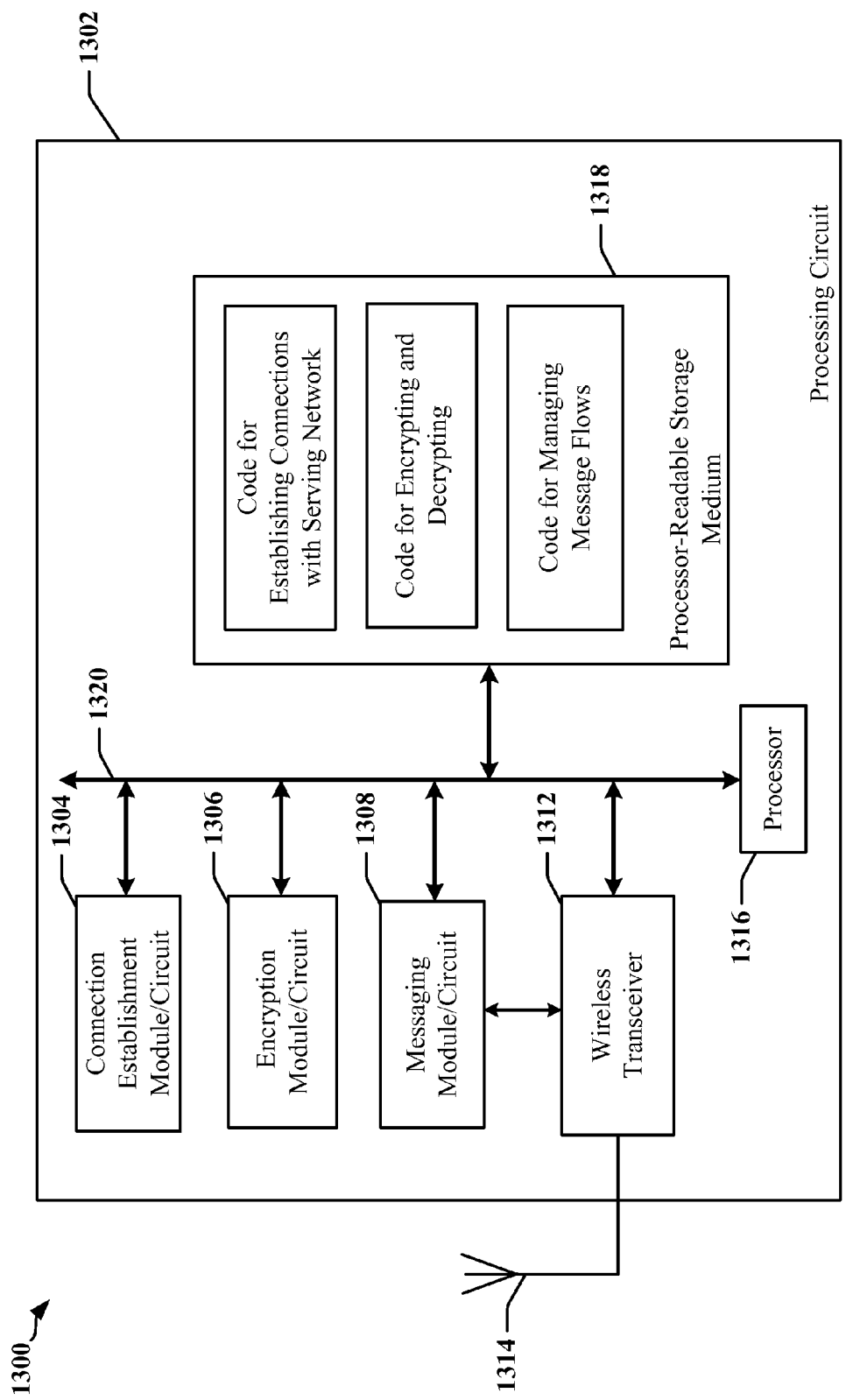
FIG. 13 illustrates a first example of a hardware implementation for an apparatus such as a UE adapted according to one or more aspects disclosed herein.

FIG. 13 is a block schematic diagram illustrating a simplified example of a hardware implementation for an apparatus 1300 employing a processing circuit 1302. The processing circuit typically has a processor 1316 that may include one or more of a microprocessor, microcontroller, digital signal processor, a sequencer and a state machine. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the processor 1316, the modules or circuits 1304, 1306 and 1308, wireless transceiver circuits 1312 configurable to communicate through an antenna 1314 and the computer-readable storage medium 1318. The bus 1320 may also link various other circuits such as timing sources, peripherals, voltage regulators, and power management circuits, which are well known in the art, and therefore, will not be described any further.

The processor 1316 is responsible for general processing, including the execution of software stored on the computer-readable storage medium 1318. The software, when executed by the processor 1316, causes the processing circuit 1302 to perform the various functions described supra for any particular apparatus. The computer-readable storage medium 1318 may also be used for storing data that is manipulated by the processor 1316 when executing software, including data decoded from symbols transmitted over the antenna 1314, which may be configured as data lanes and clock lanes. The processing circuit 1302 further includes at least one of the modules 1304, 1306 and 1308. The modules 1304, 1306 and 1308 may be software modules running in the processor 1316, resident/stored in the computer-readable storage medium 1318, one or more hardware modules coupled to the processor 1316, or some combination thereof. The modules 1304, 1306 and/or 1308 may include microcontroller instructions, state machine configuration parameters, or some combination thereof.

In one configuration, the apparatus 1300 for wireless communication includes a module and/or circuit 1304 that is configured to establish a connection with a home network, a module and/or circuit 1306 that is configured to handle encryption and decryption used in communications with a serving network, and a module and/or circuit 1308 that is configured to transmit messages to, and receive messages. In one example, the messages are communicated between a UE and a serving network. In another example, the messages are communicated between a UE and a home network. In another example, the messages are communicated between a serving network and a home network.

Figure 14:
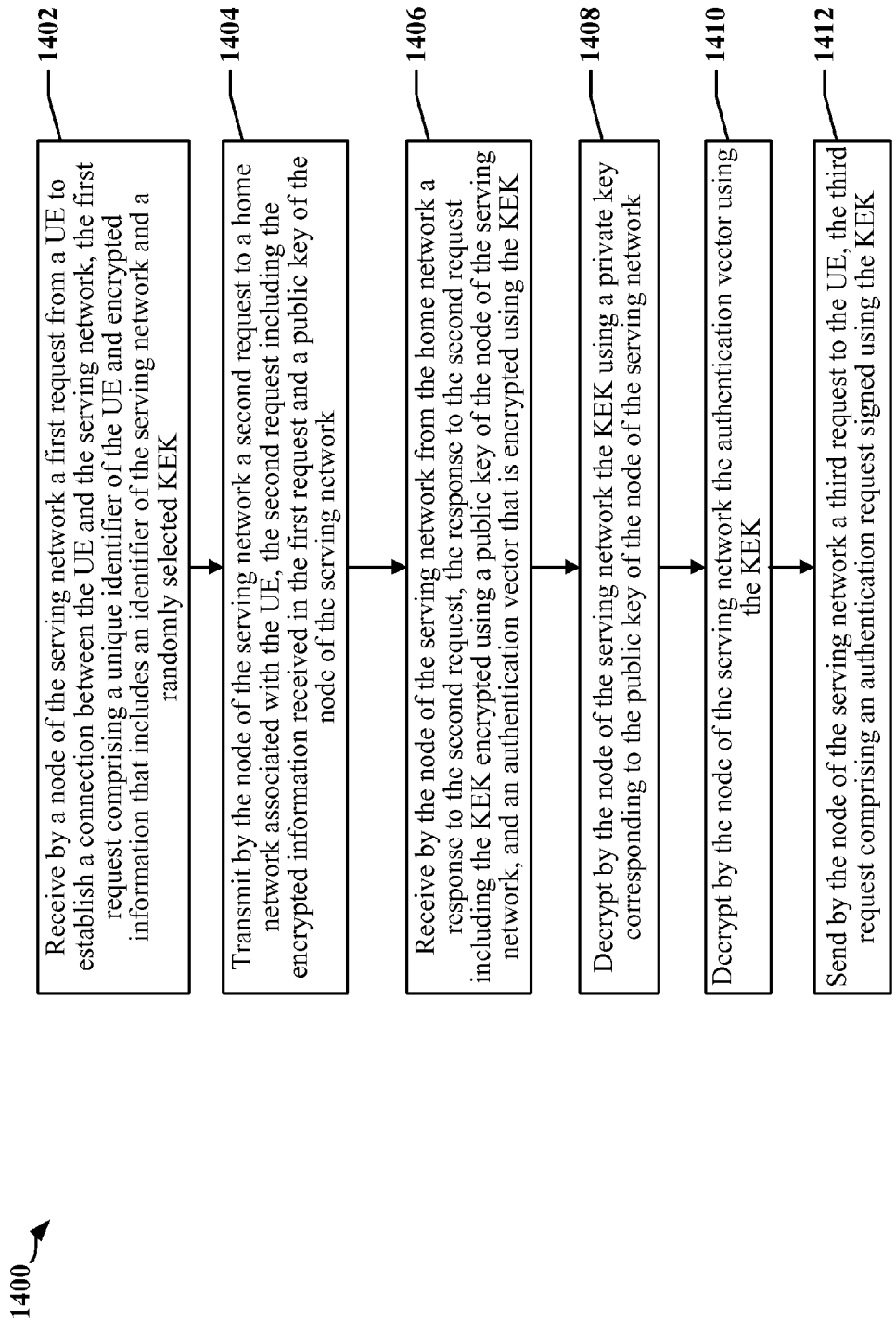
FIG. 14 is a flow chart of a method of wireless communication performed at an MME in accordance with certain aspects disclosed herein.

FIG. 14 is a flow chart 1400 of a method of wireless communication. The method may be performed by an entity of a serving network, such as an MME. At block 1402, the MME may receive a first request from a UE to establish a connection with the serving network. The first request may include a unique identifier of the UE and encrypted information that includes an identifier of the serving network and a randomly selected KEK.

At block 1404, the MME may transmit a second request to an HSS of a home network associated with the UE. The request may include the encrypted information received in the first request and a public key of the MME. The encrypted information received in the first request may have been encrypted by the UE using an encryption key of the HSS.

At block 1406, the MME may receive a response to the second request from the HSS. The response to the second request may include the KEK encrypted using a public key of the MME. The response to the second request may include an authentication vector that is encrypted using the KEK.

At block 1408, the MME may decrypt the KEK using a private key corresponding to the public key of the MME.

At block 1410, the MME may decrypt the authentication vector using the KEK.

At block 1412, the MME may send a third request to the UE. The third request may include an authentication request signed using the KEK.

In some instances, the MME may receive a response to the third request from the UE, and establish a connection between the UE and the serving network after receiving the response to the third request.

Figure 15:
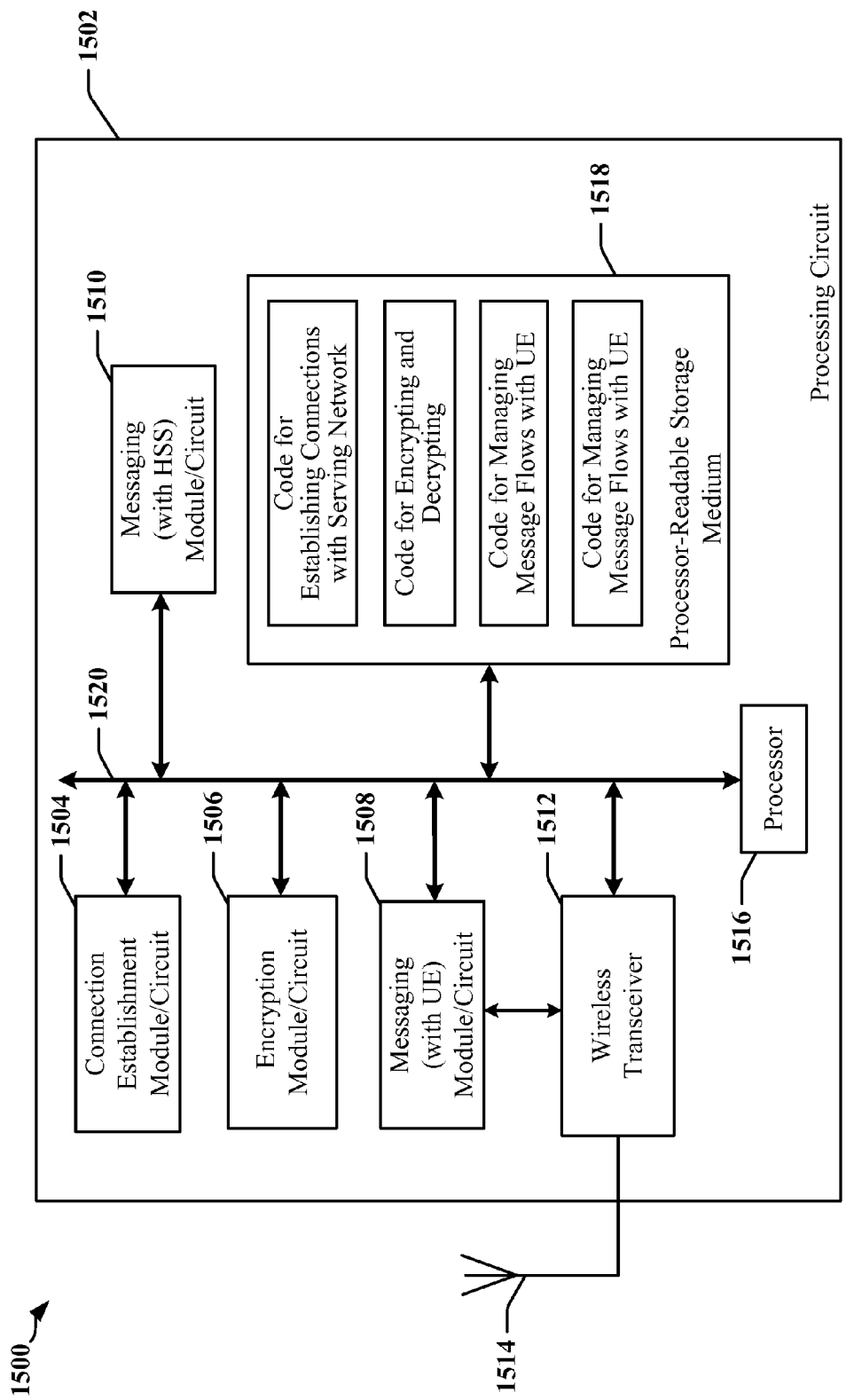
FIG. 15 illustrates a first example of a hardware implementation for an MME apparatus adapted according to one or more aspects disclosed herein.

FIG. 15 is a diagram illustrating a simplified example of a hardware implementation for an apparatus 1500 employing a processing circuit 1502. The processing circuit typically has a processor 1516 that may include one or more of a microprocessor, microcontroller, digital signal processor, a sequencer and a state machine. The processing circuit 1502 may be implemented with a bus architecture, represented generally by the bus 1520. The bus 1520 may include any number of interconnecting buses and bridges depending on the specific application of the processing circuit 1502 and the overall design constraints. The bus 1520 links together various circuits including one or more processors and/or hardware modules, represented by the processor 1516, the modules or circuits 1504, 1506, 1508 and 1510, wireless transceiver circuits 1512 configurable to communicate through an antenna 1514 and the computer-readable storage medium 1518. The bus 1520 may also link various other circuits such as timing sources, peripherals, voltage regulators, and power management circuits, which are well known in the art, and therefore, will not be described any further.

The processor 1516 is responsible for general processing, including the execution of software stored on the computer-readable storage medium 1518. The software, when executed by the processor 1516, causes the processing circuit 1502 to perform the various functions described supra for any particular apparatus. The computer-readable storage medium 1518 may also be used for storing data that is manipulated by the processor 1516 when executing software, including data decoded from symbols transmitted over the antenna 1514, which may be configured as data lanes and clock lanes. The processing circuit 1502 further includes at least one of the modules 1504, 1506 and 1508. The modules 1504, 1506, 1508 and 1510 may be software modules running in the processor 1516, resident/stored in the computer-readable storage medium 1518, one or more hardware modules coupled to the processor 1516, or some combination thereof. The modules 1504, 1506, 1508 and/or 1510 may include microcontroller instructions, state machine configuration parameters, or some combination thereof.

In one configuration, the apparatus 1500 for wireless communication includes a module and/or circuit 1504 that is configured to establish a connection with one or more UEs, a module and/or circuit 1506 that is configured to manage or handle encryption an decryption processes, a module and/or circuit 1508 that is configured to transmit and receive messages to and from the UE, and/or a module and/or circuit 1508 that is configured to transmit and receive messages to and from a HSS.

Figure 16:
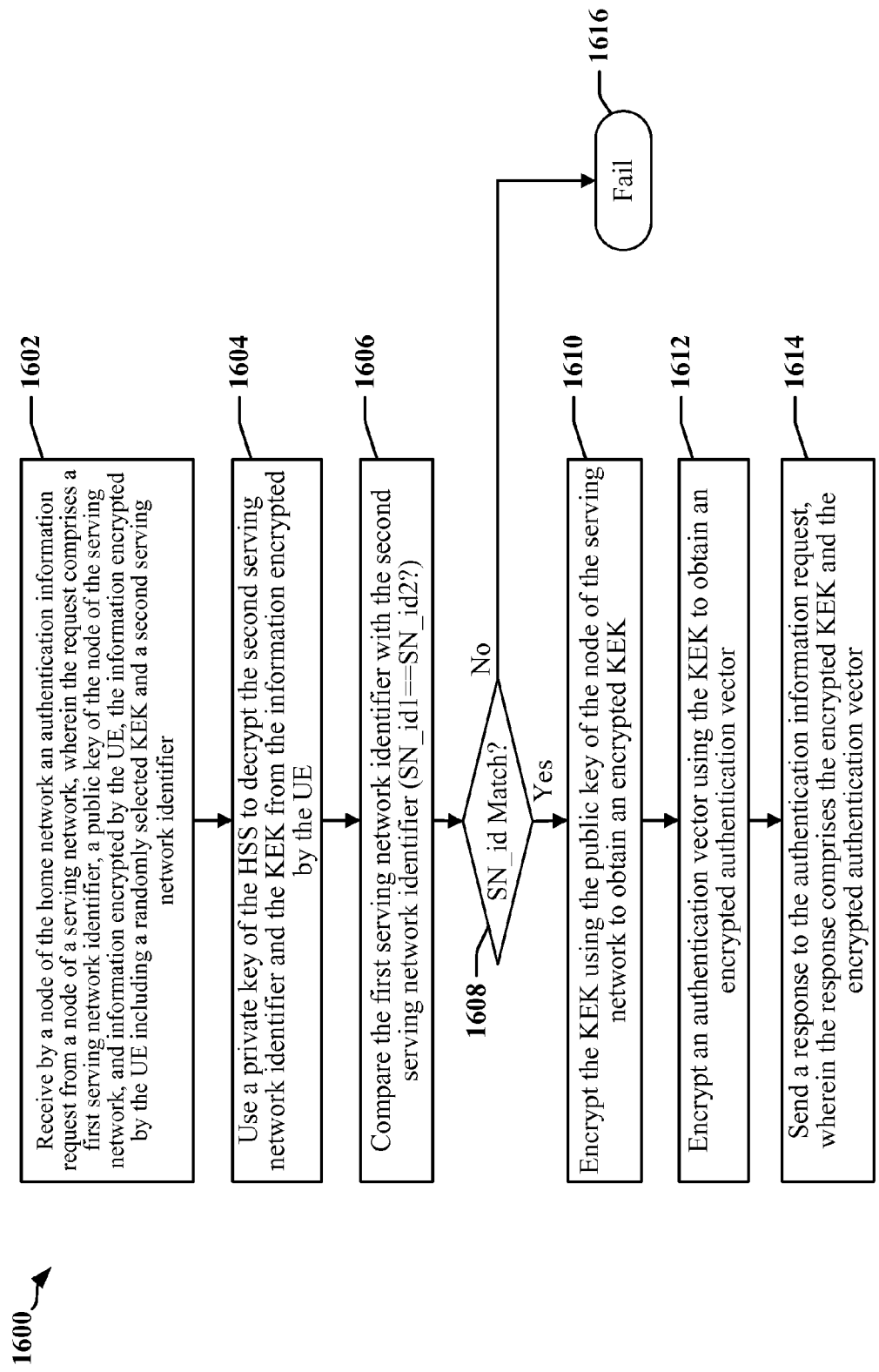
FIG. 16 is a flow chart of a method of wireless communication performed at an HSS in accordance with certain aspects disclosed herein.

FIG. 16 is a flow chart 1600 of a method of wireless communication. The method may be performed by an HSS in a home network of a UE. At block 1602, the HSS may receive an authentication information request from a node of a serving network. The node of the serving network may be a MME. The request may include a first serving network identifier, a public key of the node of the serving network, and information encrypted by the UE. The information encrypted by the UE may include a randomly selected KEK and a second serving network identifier. In some instances, the information encrypted by the UE is encrypted using a symmetric cipher based on a key shared with the HSS. In some instances, the information encrypted by the UE is encrypted using an asymmetric cipher based on a public key of the HSS.

At block 1604, the HSS may use a private key of the HSS to decrypt the second serving network identifier and the KEK from the information encrypted by the UE.

At block 1606, the HSS may compare the first serving network identifier with the second serving network identifier.

At block 1608, the next block is determined based on whether the first serving network identifier matches the second serving network identifier. When no match is found, the method may terminate in authentication failure at block 1616. When a match is found, the method may continue at block 1610.

At block 1610, the HSS may encrypt the KEK using the public key of the node of the serving network to obtain an encrypted KEK.

At block 1612, the HSS may encrypt an authentication vector using the KEK to obtain an encrypted authentication vector.

At block 1614, the HSS may send a response to the authentication information request, where the response includes the encrypted KEK and the encrypted authentication vector.

Figure 17:
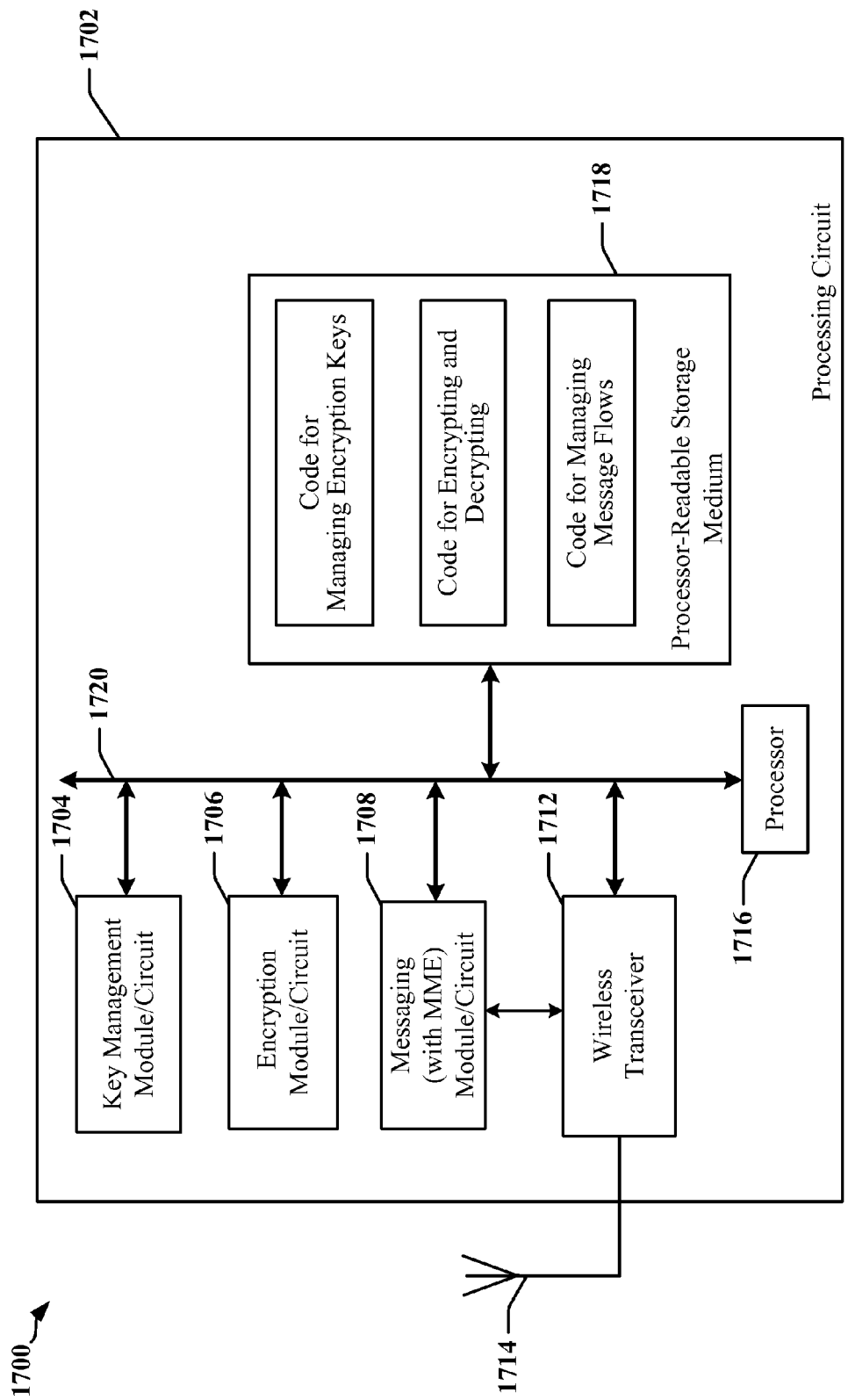
FIG. 17 illustrates an example of a hardware implementation for an HSS apparatus adapted according to one or more aspects disclosed herein.

FIG. 17 is a diagram illustrating a simplified example of a hardware implementation for an apparatus 1700 employing a processing circuit 1702. The processing circuit typically has a processor 1716 that may include one or more of a microprocessor, microcontroller, digital signal processor, a sequencer and a state machine. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the processor 1716, the modules or circuits 1704, 1706 and 1708, wireless transceiver circuits 1712 configurable to communicate through an antenna 1714 and the computer-readable storage medium 1718. The bus 1720 may also link various other circuits such as timing sources, peripherals, voltage regulators, and power management circuits, which are well known in the art, and therefore, will not be described any further.

The processor 1716 is responsible for general processing, including the execution of software stored on the computer-readable storage medium 1718. The software, when executed by the processor 1716, causes the processing circuit 1702 to perform the various functions described supra for any particular apparatus. The computer-readable storage medium 1718 may also be used for storing data that is manipulated by the processor 1716 when executing software, including data decoded from symbols transmitted over the antenna 1714, which may be configured as data lanes and clock lanes. The processing circuit 1702 further includes at least one of the modules 1704, 1706 and 1708. The modules 1704, 1706 and 1708 may be software modules running in the processor 1716, resident/stored in the computer-readable storage medium 1718, one or more hardware modules coupled to the processor 1716, or some combination thereof. The modules 1704, 1706 and/or 1708 may include microcontroller instructions, state machine configuration parameters, or some combination thereof.

In one configuration, the apparatus 1700 for wireless communication includes a module and/or circuit 1704 that is configured to manage encryption keys associated with a home network, a module and/or circuit 1706 that is configured to manage or perform encryption and decryption related to messages transmitted within the home network and between the home network and a serving network, and a module and/or circuit 1708 that is configured to transmit messages to, and receive messages from the serving network.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication at a user equipment (UE), comprising:
    establishing by the UE a wireless connection with a serving network;
    transmitting by the UE a first message comprising an authentication credential that includes a randomly selected key encryption key (KEK) and a serving network identifier to the serving network, wherein the authentication credential is encrypted by the UE using an encryption key associated with a home network;
    receiving by the UE a second message responsive to the first message, wherein the second message includes an authentication request from the serving network and a signature generated by a node of the serving network using the KEK; and
    authenticating by the UE the serving network based on the signature.

2. The method of claim 1, wherein authenticating the serving network comprises:
    authenticating the serving network when the signature was generated using a copy of the KEK, wherein the signature is generated using a copy of the KEK when the serving network has received a copy of the KEK during an exchange of encrypted messages with the home network that is initiated by a node of the serving network in response to the first message.

3. The method of claim 1, wherein the signature is generated by a mobility management entity (MME) of the serving network.

4. The method of claim 1, further comprising:
    using a symmetric cipher based on a key shared between the UE and a node of the home network to encrypt the authentication credential.

5. The method of claim 4, wherein the node of the home network comprises a home subscriber server (HSS).

6. The method of claim 4, wherein the node of the home network comprises an authentication, authorization, and accounting (AAA) server.

7. The method of claim 1, further comprising:
    using an asymmetric cipher based on a public key of a node of the home network to encrypt the authentication credential.

8. The method of claim 7, wherein establishing the connection with the serving network comprises:
    establishing a secured connection with a home subscriber server (HSS) of the home network.

9. The method of claim 7, wherein the node of the home network comprises an authentication, authorization, and accounting (AAA) server.

10. The method of claim 1, wherein the second message comprises a message authentication code generated using the KEK.

11. The method of claim 10, wherein the second message is generated by an MME after the MME receives a response to an authentication information request transmitted to a HSS, wherein the response to the authentication information request is transmitted by the HSS to the MME and is encrypted using a public key of the MME.

12. A method for wireless communication in a serving network, comprising:
    receiving by a node of the serving network a first request from a user equipment (UE) to establish a connection between the UE and the serving network, the first request comprising a unique identifier of the UE and encrypted information that includes an identifier of the serving network and a randomly selected key encryption key (KEK);

transmitting by the node of the serving network a second request to a home network associated with the UE, the second request including the encrypted information received in the first request and a public key of the node of the serving network;

receiving by the node of the serving network from the home network a response to the second request, the response to the second request including the KEK encrypted using a public key of the node of the serving network, and an authentication vector that is encrypted using the KEK;

decrypting by the node of the serving network the KEK using a private key corresponding to the public key of the node of the serving network;

decrypting by the node of the serving network the authentication vector using the KEK; and sending by the node of the serving network a third request to the UE, the third request comprising an authentication request signed using the KEK.

13. The method of claim 12, wherein the encrypted information received in the first request is encrypted by the UE using an encryption key of the home network.

14. The method of claim 12, further comprising:
receiving a response to the third request from the UE; and
establishing a connection between the UE and the serving network after receiving the response to the third request.

15. A method for wireless communication in a home network of a user equipment (UE), comprising:
receiving by a node of the home network an authentication information request from a node of a serving network, wherein the request comprises a first serving network identifier, a public key of the node of the serving network, and information encrypted by the UE, the information encrypted by the UE including a randomly selected key encryption key (KEK) and a second serving network identifier;
using a private key of the home network to decrypt the second serving network identifier and the KEK from the information encrypted by the UE; and
sending a response to the authentication information request that includes an encrypted KEK and an encrypted authentication vector when the first serving network identifier matches the second serving network identifier.

16. The method of claim 15, wherein the node of the serving network comprises a mobility management entity (MME).

17. The method of claim 15, wherein the information encrypted by the UE is encrypted using a symmetric cipher based on a key shared between the UE and a node of the home network.

18. The method of claim 17, wherein the node of the home network comprises a home subscriber server (HSS).

19. The method of claim 17, wherein the node of the home network comprises an authentication, authorization, and accounting (AAA) server.

20. The method of claim 15, wherein the information encrypted by the UE is encrypted using an asymmetric cipher based on a public key of a node of the home network.

21. The method of claim 20, wherein the node of the home network comprises a home subscriber server (HSS).

22. The method of claim 20, wherein the node of the home network comprises an authentication, authorization, and accounting (AAA) server.

23. The method of claim 15, further comprising:
encrypting the KEK using the public key of the node of the serving network to obtain the encrypted KEK; and
encrypting an authentication vector using the KEK to obtain the encrypted authentication vector.

24. An apparatus, comprising:
means for establishing a connection between a user equipment (UE) and a serving network;
means for communicating a first message to a home network associated with the UE, wherein the first message comprises an authentication credential encrypted by the UE using an encryption key of the home network; and
means for authenticating the serving network based on a comparison of a first identification of the serving network provided by a node of the serving network and a second identification of the serving network provided in the authentication credential,
wherein a node of the home network is configured to decrypt the authentication credential to obtain the second identification and a key encryption key (KEK) provided by the UE, and to provide a version of the KEK to the node of the serving network that is encrypted using a public key of the node of the serving network, and
wherein the means for authenticating the serving network is configured to authenticate the serving network after the node of the serving network has transmitted to the UE an authentication request signed using the KEK.

25. The apparatus of claim 24, wherein the node of the serving network comprises a mobility management entity (MME).

26. The apparatus of claim 24, wherein the means for authenticating the serving network is configured to:
authenticate the node of the serving network when the network generates a signature using the version of the KEK provided by the node of the home network.

27. The apparatus of claim 24, wherein the authentication credential is encrypted using a symmetric cipher based on a key shared between the UE and a node of the home network.

28. The apparatus of claim 27, wherein the node of the home network comprises a home subscriber server (HSS) or an authentication, authorization, and accounting (AAA) server.

29. The apparatus of claim 24, wherein the authentication credential is encrypted using an asymmetric cipher based on a public key of a node of the home network.

30. The apparatus of claim 29, wherein the node of the home network comprises a home subscriber server (HSS) or an authentication, authorization, and accounting (AAA) server.

* * * * *